(12) United States Patent
Bryant et al.

(10) Patent No.: US 7,608,783 B2
(45) Date of Patent: *Oct. 27, 2009

(54) COLLET-TYPE SPLICE AND DEAD END FOR USE WITH AN ALUMINUM CONDUCTOR COMPOSITE CORE REINFORCED CABLE

(75) Inventors: David Bryant, Laguna Beach, CA (US); Orlando Hernandez, Whittier, CA (US); James Tate, Placentia, CA (US); Doug Pilling, Bonita, CA (US)

(73) Assignee: CTC Cable Corporation, Irvine, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 11/306,951

(22) Filed: Jan. 17, 2006

(65) Prior Publication Data

US 2007/0205016 A1 Sep. 6, 2007

Related U.S. Application Data

(63) Continuation-in-part of application No. 10/911,072, filed on Aug. 4, 2004, now Pat. No. 7,019,217, and a continuation-in-part of application No. 10/690,839, filed on Oct. 22, 2003, now Pat. No. 7,041,909.

(51) Int. Cl.
*H02G 3/06* (2006.01)
(52) U.S. Cl. .................................................. 174/88 R
(58) Field of Classification Search ............... 174/88 R, 174/84 R, 84 C; 439/863, 877
See application file for complete search history.

(56) References Cited

U.S. PATENT DOCUMENTS

| | | | | |
|---|---|---|---|---|
| 1,539,962 A | * | 6/1925 | Seufert et al. | 439/796 |
| 2,078,051 A | * | 4/1937 | Berndt | 439/788 |
| 2,166,458 A | * | 7/1939 | Berndt et al. | 439/788 |

(Continued)

FOREIGN PATENT DOCUMENTS

EP 1124235 A2 8/2001

(Continued)

OTHER PUBLICATIONS

Written Opinion of the International Searching Authority and International Search Report for International Application PCT/US04/35199.

(Continued)

*Primary Examiner*—Chau N Nguyen
(74) *Attorney, Agent, or Firm*—Marsh Fischmann & Breyfogle LLP

(57) ABSTRACT

This invention relates to collet-type splices and collet-type dead ends and methods for splicing together two electricity transmission cables or terminating one electricity transmission cable, the cables comprising a composite core surrounded by a conductor. The collet-type fittings use a collet inside a collet housing to hold the composite cores without penetrating or otherwise weakening the core itself. The composite cores can be stripped of the aluminum conductor to provide a bond between the collet and the composite core. The collet seats within the collet housing thereby holding the composite core with frictional forces. The design of the collet enables the composite core to stretch longitudinally through the collet to strengthen the frictional hold.

27 Claims, 14 Drawing Sheets

U.S. PATENT DOCUMENTS

| | | |
|---|---|---|
| 2,988,727 A | 8/1961 | Berndt |
| 3,184,535 A | 5/1965 | Worthington |
| 3,384,704 A * | 5/1968 | Vockroth .................... 174/90 |
| 3,810,078 A | 5/1974 | Chordas |
| 4,183,686 A | 1/1980 | De France |
| 4,362,352 A | 12/1982 | Hawkins et al. |
| 4,496,212 A | 1/1985 | Harvey |
| 4,627,490 A | 12/1986 | Moore |
| 5,683,273 A | 11/1997 | Garver |
| 5,821,459 A | 10/1998 | Cheenne-Astorino |
| 6,015,953 A | 1/2000 | Tosaka et al. |
| 6,193,565 B1 | 2/2001 | Herron |
| 6,773,311 B2 | 8/2004 | Mello |
| 6,805,596 B2 | 10/2004 | Quesnel |
| 6,817,909 B2 | 11/2004 | Dobrinski |
| 7,019,217 B2 * | 3/2006 | Bryant .................... 174/88 R |
| 7,041,909 B2 * | 5/2006 | Hiel et al. ................. 174/88 R |
| 2004/0026112 A1 | 2/2004 | Goldsworthy et al. |
| 2005/0061538 A1 | 3/2005 | Blucher |
| 2007/0187131 A1 | 8/2007 | Bryant |

FOREIGN PATENT DOCUMENTS

| | | |
|---|---|---|
| EP | 1168374 A2 | 1/2002 |
| EP | 1335453 A2 | 8/2003 |
| WO | 98/59393 A1 | 12/1998 |

OTHER PUBLICATIONS

3M, Aluminum Conductor Composite Reinforced Technical Notebook (795 kcmil family) Conductor and Accessory Testing, Apr. 2003, pp. 1-22.

Fargo Mfg. Company, "XL' Dead Ends and Splices", New Product Bulletin, Apr. 1997, Sect. 8, pp. 5, 9, 11, 46, 47 & 81.

* cited by examiner

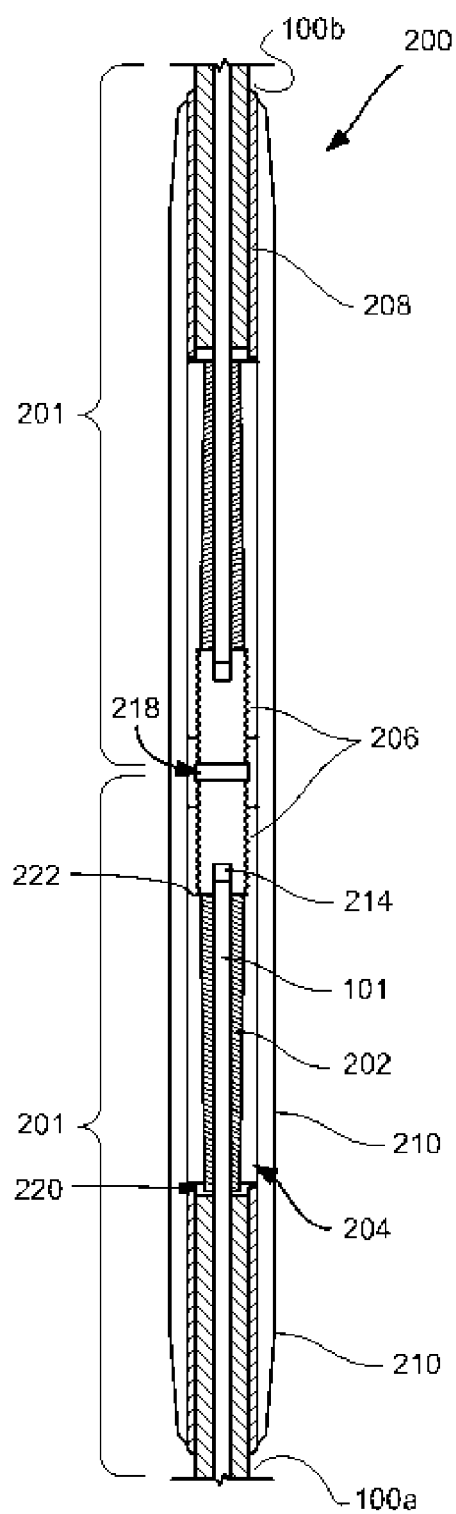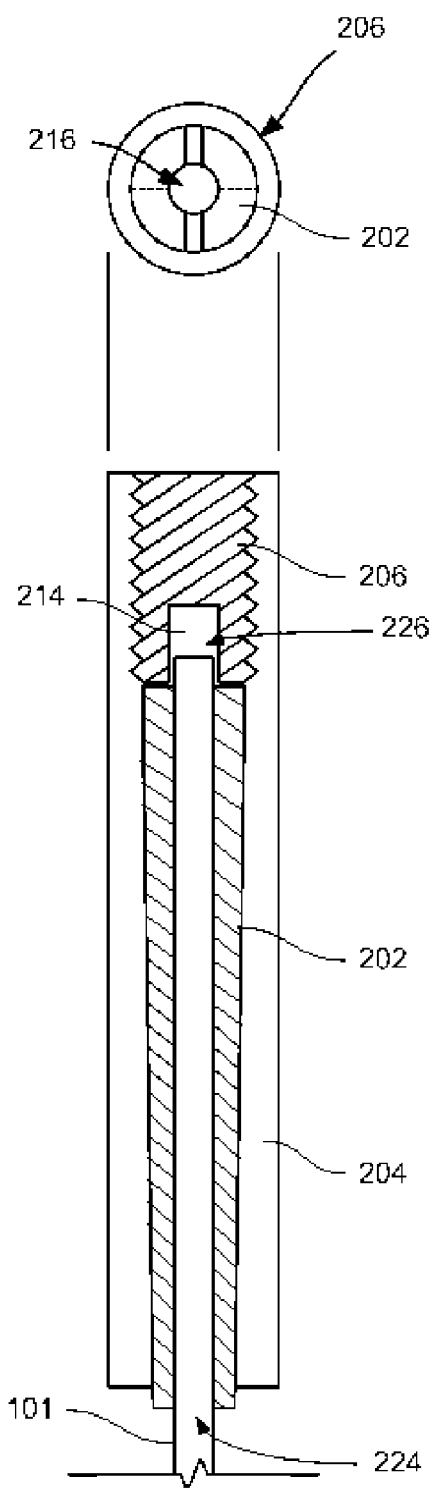
FIG. 2A
FIG. 2B

COLLET-TYPE SPLICE AND DEAD END FOR USE WITH AN ALUMINUM CONDUCTOR COMPOSITE CORE REINFORCED CABLE

In relation to this Continuation in Part Application, applicants claim priority of earlier pending U.S. CIP application Ser. No. 10/911,072 filed in the United States Patent and Trademark Office on Aug. 4, 2004, which is incorporated by reference herein, and to pending PCT Application PCT/US04/035199 filed on Oct. 22, 2004, which is incorporated by reference herein, each of which claims priority from pending U.S. CIP application Ser. No. 10/690,839 filed in the United States Patent and Trademark Office on 22 Oct. 2003, which is incorporated by reference herein and which claims priority from earlier pending PCT filing PCT/US03/12520 filed in the International Receiving Office of the United States Patent and Trademark Office on 23 Apr. 2003, the entire disclosure of which is incorporated by reference herein, which claims priority from U.S. provisional application Ser. No. 60/374,879 filed in the United States Patent and Trademark Office on 23 Apr. 2002, the entire disclosure of which is incorporated by reference herein.

BACKGROUND OF THE INVENTION

Current methods and devices to splice or terminate composite core reinforced cables, such as those disclosed in PCT Application No. PCT/US03/12520 and incorporated by reference herein, do not exist. Generally, the splice functions as both a mechanical and an electrical junction between the ends of two cables. Splices for use with traditional aluminum conductor steel reinforced cable are known in the art. However, due to the differences in the physical properties of aluminum conductor composite core reinforced cables, as compared to traditional aluminum conductor steel reinforced cable, existing devices and methods to splice will not be effective.

Traditional aluminum conductor steel reinforced cable (ACSR) is formed from a set of twisted aluminum conductors wrapped around a core of steel wires. In ACSR type cables, the steel reinforces the tensile strength of the aluminum. For example, in a properly sagged conductor at normal operating temperatures in the range of 60° C. to 75° C. the aluminum stranding of ACSR conductor carries approximately 40% of the tensile load. The balance is carried by the steel. As the conductor increases in temperature, the aluminum, expanding at a faster rate than the steel, transfers more load to the steel. Connectors designed for use with ACSR are designed with this in mind, where the steel component of the system does not carry the full tension of the conductor. Therefore, the steel components of these connectors are sized accordingly.

To splice two ACSR cable spans, linemen use a device such as a full tension compression splice. For this device, a lineman strips the aluminum away from the steel core. A sleeve or die is placed over the end of the exposed core. The lineman leaves a small part of the steel core exposed beyond the end of the sleeve. A compression vise is used to affix the sleeve to the steel core. The sleeve and steel core from both cables are then inserted into a second tube. The tube is long enough to cover the sleeve and part of the aluminum conductor that was not stripped away. This tube is also crimped with a compression vise. These implements create compression fittings that hold both the aluminum conductor and the steel core.

Splices designed for ACSR cables are ineffective with aluminum conductor composite core reinforced cables. As opposed to ACSR cables, the composite core member is the load carrying member in aluminum conductor composite core reinforced cables and connectors must be designed with this in mind. Accordingly, crimping a tube to the aluminum conductor does not hold together the composite core load-bearing members of the two cables. Moreover, because the composite core is much stronger than a traditional steel core and because the conventional inner steel tubes of a traditional splice are imprecise, crimping of the steel tube to the composite core would not provide adequate grip at the higher rated tensions for example, 41,000 pounds vs. 31,500 for a conventional Drake size. This lack of precision may further cause stress concentration points which may compromise longevity of the core.

Thus, a need exists for an apparatus to splice and terminate composite core reinforced cables and other composite core cables.

SUMMARY OF THE INVENTION

A splice fitting to connect a first electricity transmission cable to a second electricity transmission cable, each cable comprising a composite core surrounded by a conductor, is disclosed. In various embodiments, the splice comprises at least two collet-type fittings and a connecting device. The collet-type fittings further comprise a collet having a lumen to hold the composite core, the lumen further comprising an interior surface adapted to grip the core without penetrating into the core and a collet housing comprising at least one end adapted to couple with a connecting device and further configured to seat the collet within the collet housing. The connecting device coupling with the collet housing compresses the collet inside the collet housing. Compressing the collet exerts a compressive and frictional force on the composite core of the cable.

In another embodiment, a splice fitting to connect a first electricity transmission cable to a second electricity transmission cable, each cable comprising a composite core surrounded by a conductor, is disclosed. In various embodiments the splice comprises at least two collet-type fittings and a connecting device. The collet-type fittings further comprise a collet housing adapted to hold a collet, the housing having at least one end configured to couple with a connecting device and a collet that seats within the collet housing, the collet having a lumen to hold the composite core, the lumen further comprising an interior surface adapted to grip the core without penetrating into the core. The connecting device connects the at least two collet-type fittings to form the splice wherein, coupling with the collet housing compresses the collet inside the collet housing and wherein compressing the collet exerts a compressive and frictional force on the composite core of the cable.

In yet another embodiment, a collet-type dead end to terminate an electricity transmission cable, the cable comprising a composite core member surrounded by a conductor, is disclosed. In various embodiments, the dead end comprises a first collet-type fitting adapted to receive the composite core member, at least a second collet-type fitting connected to the at least first collet-type fitting, and a connector that couples between the first collet-type fitting and a structure. In this embodiment, the first collet-type fitting comprises at least a collet and a collet housing, wherein the collet housing is adapted to engage a second collet-type fitting. The at least second collet-type fitting is connected to at least the first collet-type fitting and further comprises a collet and a collet housing. The connector comprises a first end and a second end, the first end of the connector adapted to couple with the first collet-type fitting, and the second end adapted to couple with a structure, wherein the first end functions to seat and compress the collet within the collet housing. Compression of the collet exerts a compressive and frictional force on the composite core of the cable.

The dead ends and splices and other features of the invention are best understood by referring to the detailed description of the invention, read in light of the accompanying drawings.

BRIEF DESCRIPTION OF THE DRAWINGS

FIG. 2A through FIG. 2B are cross-sectional views of one embodiment of a collet-type splice and its corresponding elements according to the present invention.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that the disclosure will fully convey the scope of the invention to those skilled in the art. The drawings are not necessarily drawn to scale but are configured to clearly illustrate the invention. Throughout this description, the term "couple", "couples", or "coupled" means any type of physical attachment or connection of two parts.

Figure 1:
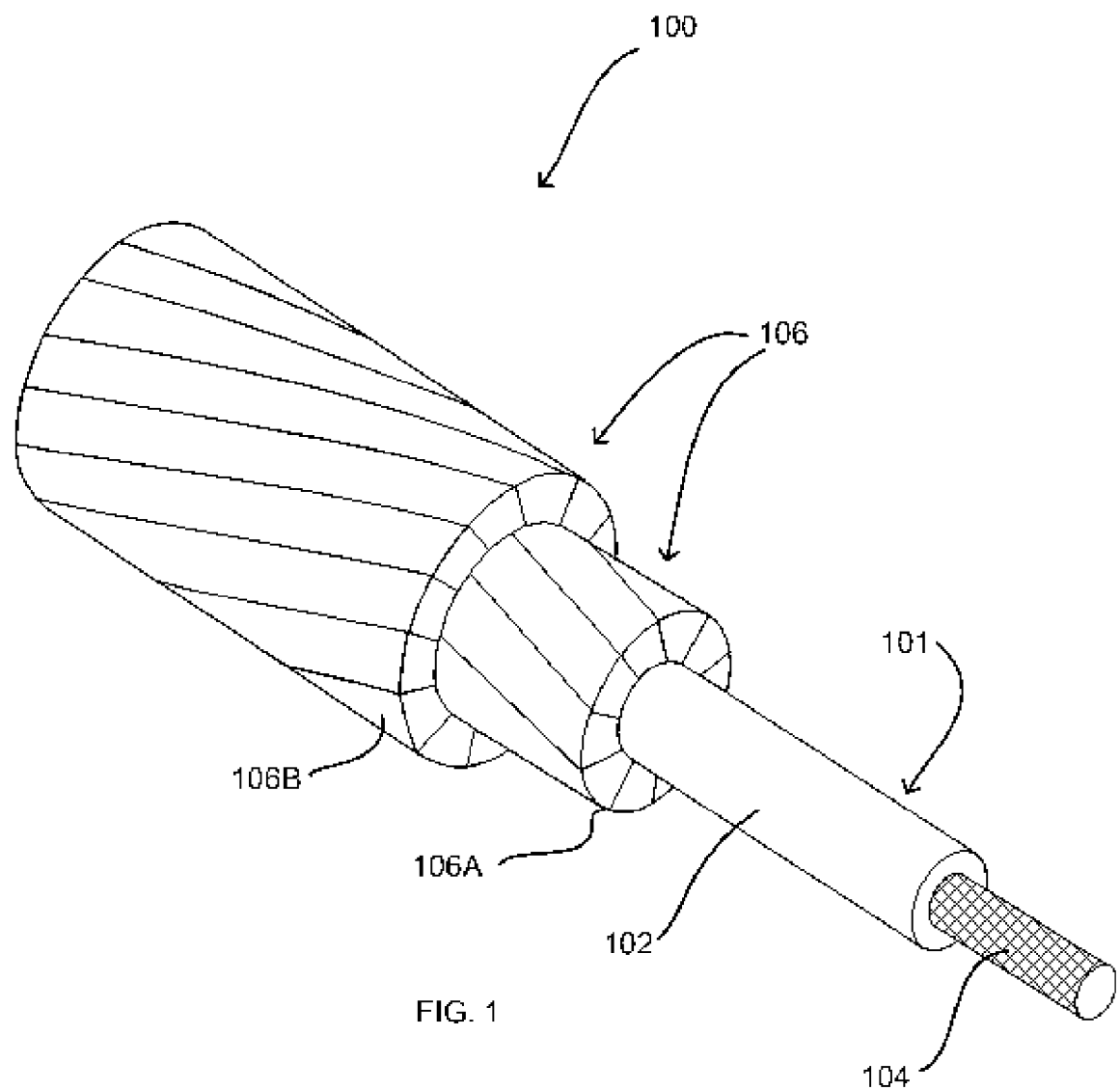
FIG. 1 is a three dimensional view of an embodiment of a composite core reinforced cable.

The present invention relates to methods and apparatuses to connect or splice together two composite core 101 reinforced cables. As used herein, composite core refers generally to a core comprised of a plurality of fibers embedded in a resin matrix. FIG. 1 illustrates one embodiment of an aluminum conductor composite core reinforced cable 100. More specifically, FIG. 1 illustrates an aluminum conductor composite core reinforced cable 100 having a reinforced carbon fiber/epoxy resin composite inner core 104 and a reinforced glass fiber/epoxy resin composite outer core 102, surrounded by a first layer of aluminum conductor 106A, wherein a plurality of trapezoidal shaped aluminum strands wrap around the composite core 101, and surrounded by a second layer of aluminum conductor 106B wherein a plurality of trapezoidal shaped aluminum strands wrap around the first aluminum layer 106A. For this description, the splice and dead end fittings will be explained using this one embodiment of the composite core 101 cable 100 as an example. However, the splice and dead end fittings may be used with any embodiment of composite core reinforced cables 100.

To determine how to make the splice or dead end, an understanding of the forces affecting the cable 100 is needed. All explanations that follow apply to an aluminum conductor composite core reinforced cable that is equivalent to a Drake style ACSR cable. For this type of cable 100, the required tensional force a splice must maintain is a minimum of 95% of the cable's rated strength. For example, in the case of a Drake sized aluminum conductor composite core reinforced cable, which has a strength rating of 41,000 pounds, the 95% minimum is approximately 38,950 pounds. Thus, the splice should be able to maintain a tensional force of around 41,000 pounds. In a frictional fitting explained below, the splice or dead end counteract the tensional force by making a frictional coupling between the fittings and the composite core 101. To keep the composite core 101 from slipping out of the splice or dead end, the frictional force should be the same or greater than the tensional force. Accordingly, to maintain a tensional force of 40,000 pounds, the splice or dead end must apply a frictional force of 40,000 pounds or more. A frictional force is a function of the area under contact, the compressive force of the contact, and the coefficient of friction. Frictional force is calculated according to the equation:

$$\text{Frictional Force} = (\text{Coefficient of Friction}) \times (\text{Compressive Force}) \times (\text{Area})$$

As stated before, the frictional force should be equal to or greater than the tensional load on the cable 100. Thus, the frictional force should be at least 40,000 pounds. For the purposes of this embodiment, the Coefficient of Friction will be assumed to be 1. The composite core 101 of the aluminum conductor composite core reinforced cable 100 may be able to withstand a compressive force up to 10,000 pounds. For safety purposes, a lesser compressive force of 4,000 pounds may be used. The area under contact is the product of the length of the composite core 101 set in the splice or dead end times the outside circumference of the composite core 101. The circumference of a composite core 101, with a 0.371 outside diameter, is about 1.17 inches. The amount of frictional force may be adjusted by placing more or less of a length of the composite core 101 under compression. In this example, the length under compression could be 12 inches. As an example, twelve inches of the composite core 101, with a circumference of 1.17 inches, would need to be compressed 2850 pounds to achieve 40,000 pounds of frictional force. One skilled in the art will recognize how to apply these formulas to determine how to modify the dead ends and splices according to the present invention. In preliminary tests, the splice of the present invention, with similar dimensions, was able to withstand a tensional force of over 42,000 pounds.

Composite cores differ structurally from traditional steel wire cores as found in a typical ACSR cable. Composite cores are comprised of a plurality of fibers embedded in a resin matrix to form a fiber/resin matrix. The strength of such composite cores depend on the physical properties of the components of the fiber/resin matrix, in addition to physical properties that result from the manufacturing process. For example, to produce high strength composite cores, the fibers are pre-tensioned and pulled through a resin matrix, wherein the resin and the fibers are selected to comprise predetermined inherent physical properties. The manufacturing process also contributes to the strength of the core. For example, the manufacturing process further enables substantial coating of the plurality of fibers within the matrix, while minimizing introduction of air bubbles and dry spots. Physical imperfections introduced during processing tend to weaken the composite core. For example, air bubbles or dry spots, tend to create micro fractures that propagate within the core and may eventually lead to core failure. Similarly, externally penetrating the core by drilling holes, notching the outer edges, or using an apparatus to "bite" into the core for example, will effectually weaken the composite structure and may lead to core failure.

Because of these characteristics of the composite core, many methods of splicing used with traditional ACSR cables will not work with composite cores. In the composites industry, composite members are often adhered together. A special glue, epoxy, or adhesive is applied to the composite and to the member being affixed to the composite. Unfortunately, several problems occur with these adhesive bonds. First, adhesives do not spread the forces applied to the bond across the entire area of the bond. Rather, forces tend to localize along one or two inches of the bond. With the incredible tensional forces on the cables (up to 60,000 pounds or more), the adhesive bonds tend to fail in successive one inch regions until the entire bond is compromised. Also, bonding to a composite member tends to apply forces to the outer fibers in the composite. Thus, as forces build, the fibers on the exterior of the composite fail, and then the bond fails also. To compensate, some composite manufacturers slice the composites lengthwise along an acute angle. Then, the two sliced composites are bonded along the slice. This bond distributes the forces along all the fibers not just those on the exterior of the composite. Unfortunately, the composite core of an aluminum conductor composite core reinforced cable is small. Making the slices in these cores would be extremely difficult. In addition, bonding the composites would require special tools, materials, and training beyond that a lineman currently enjoys. The use of adhesives in the field is also difficult because of environmental pollutants, such as moisture, dust, and other airborne materials, that can affect the proper mixing and setting of the adhesives.

Collet-Type Splice

The present invention relates to several fittings used to splice the aluminum conductor composite core reinforced cables 100. The main load bearing element of the aluminum conductor composite core reinforced cable 100 is the composite core 101. Therefore, it is advantageous to have a splice apparatus that can hold together the composite cores 101 of the aluminum conductor composite core reinforced cables 100 without penetrating the composite core 101 or weakening the composite core 101. Beyond holding together the composite cores 101, the splice should provide an electrical junction between the two or more aluminum conductor composite core reinforced cables 100.

An embodiment of a collet-type splice is shown in FIG. 2A through FIG. 2B. The embodiment of the collet-type splice 200 includes two collet-type fittings 201 coupled by a connecting device 218. In this embodiment, the collet-type fitting 201 comprises a collet 202, a collet housing 204, and at least one compression implement 206. In further embodiments, the collet-type fitting 201 may also include an aluminum filler sleeve 208 and the collet type splice 200 may include an aluminum housing 210, which may cover the two collet-type fittings 201 and the connecting device 218. In the embodiment presented in the drawings, the compression implement 206 and the connecting device 218 are formed from a single piece. However, one skilled in the art will recognize other embodiments where these elements are formed from separate parts. The elements of the collet-type fitting 201 function to mate with the composite core 101 of the aluminum conductor composite core reinforced cable 100 and compress the collet 202 such that friction holds the composite core 101. Each element will be explained further below.

The collet 202 is a structure that can be compressed under great pressure. In one embodiment, the collet 202 may be a conical piece with a lumen 214 concentrically oriented along the length of the collet 202. The lumen 214 is configured to receive the composite core 101. That is, the lumen is adapted to hold the composite core. The outer diameter of the collet 202 increases from a first end 220 of the collet 202 to a second end 222, but the interior radius of the lumen 214 remains constant. While the collet 202 may be formed from two or more sections, the collet 202 may also be formed by one or more sections. In a further embodiment, the collet 202 may comprise one or more longitudinal slits that function to increase flexibility and compressibility of the collet 202. The outside slope or change in diameter from the first end 220 to the second end 222 of the collet 202 should be neither too shallow nor too steep. If the slope is too shallow, the collet 202 may be forcibly pulled through the end of the collet housing 204. Likewise, if the slope is too steep, the collet 202 will not slide within the collet housing 204 and apply increasing compressive forces on the composite core 101. In an exemplary embodiment, the collet 202 has an outside radius at the first end 220 of 0.326 inches and an outside radius at the second end 222 of 0.525 inches.

A collet 202 may be made from any material that can be formed into an appropriate shape and be used to put compressive forces on the composite core 101. Examples of such materials may include, but are not limited to, varying strengths of stainless steel, semi-malleable metals or polymers that can compress. One embodiment of the collet 202 is made from aluminum. The aluminum provides enough malleability to form around the composite core 101 during compression but maintain its general shape with the collet-housing 204.

The collet 202 provides a lumen 214 that functions to hold the composite core 101. In one embodiment, the lumen 214 is configured to closely approximate the exterior configuration and circumference of the composite core 101. In essence, the inside shape and size of the lumen 214 is approximately the same as the outside shape and size of the exposed composite core 101. FIG. 2 shows the collet 202, its corresponding lumen 214, and the composite core 101 having a generally circular cross section. However, the composite core 101, the collet 202, and the lumen 214 may have other shapes for cross sectional profiles.

In the exemplary embodiment shown in FIG. 2A though FIG. 2B, the lumen 214 extends within the collet 202 concentrically along the length of the collet 202 between the first end 220 and the second end 222. In the embodiment shown, there are two separate and distinct collets 202, with a connecting device 218 separating and connecting the two collets 202.

Another element of the collet-type fitting 201 is the collet housing 204. The collet housing 204 provides an enclosure to hold the collet 202. The interior of the collet housing 204 is adapted to allow the collet 202 to fit inside the collet housing 204. In an exemplary embodiment, the collet housing 204 is a tubular piece with a funnel-shaped interior as shown in FIG. 2B configured to receive and encapsulate the conical shaped collet 202. However, the invention is not limited to that one embodiment but may assume any shape that can encapsulate the collet 202. Seating of the collet 202 within the collet housing 204 causes the collet 202 to further compress around and onto the composite core 101 as the collet 202 slides further into the collet housing 204, as will be explained in more detail hereinafter. Thus, the collet housing 204 must maintain its shape when the collet 202 is being compressed and pressing on the interior walls of the collet housing 204.

The collet housing 204 may be made of various rigid materials. The materials may include, but are not limited to, composites, graphite, hardened metals, or other sufficiently rigid and strong materials. In an exemplary embodiment, the collet housing 204 is formed from steel. The collet 202 and the collet housing 204 should be made from materials that allow the collet 202 to slide within the collet housing 204 without binding.

The collet housing 204 further comprises a first open end 226 and a second open end 224 to enable the collet 202 to receive the composite core 101. In addition, the collet housing 204 is further adapted to couple with the compression implement 206. For example, in one embodiment the housing comprises an end having a series of threads to engage the complementary threads of the compression implement 206. The compression implement 206 allows the initial compression of the collet 202 against the composite core 101 by driving the collet 202 down into the collet housing 204.

The compression implement 206 is the device or means of compressing the collet 202. Thus, the compression implement 206 is any mechanical, electrical, pneumatic, or other device that can compress the collet 202. In an exemplary embodiment, the compression implement 206 is a compression screw 206 that threads into the inside of the collet housing 204, see FIG. 2A. However, in other embodiments the compression implement 206 may use other devices and openings to compress the collet 202. Hereinafter, the compression implement 206 will be described as a compression screw 206, but the invention is not meant to be limited to that one embodiment.

Figure 3:
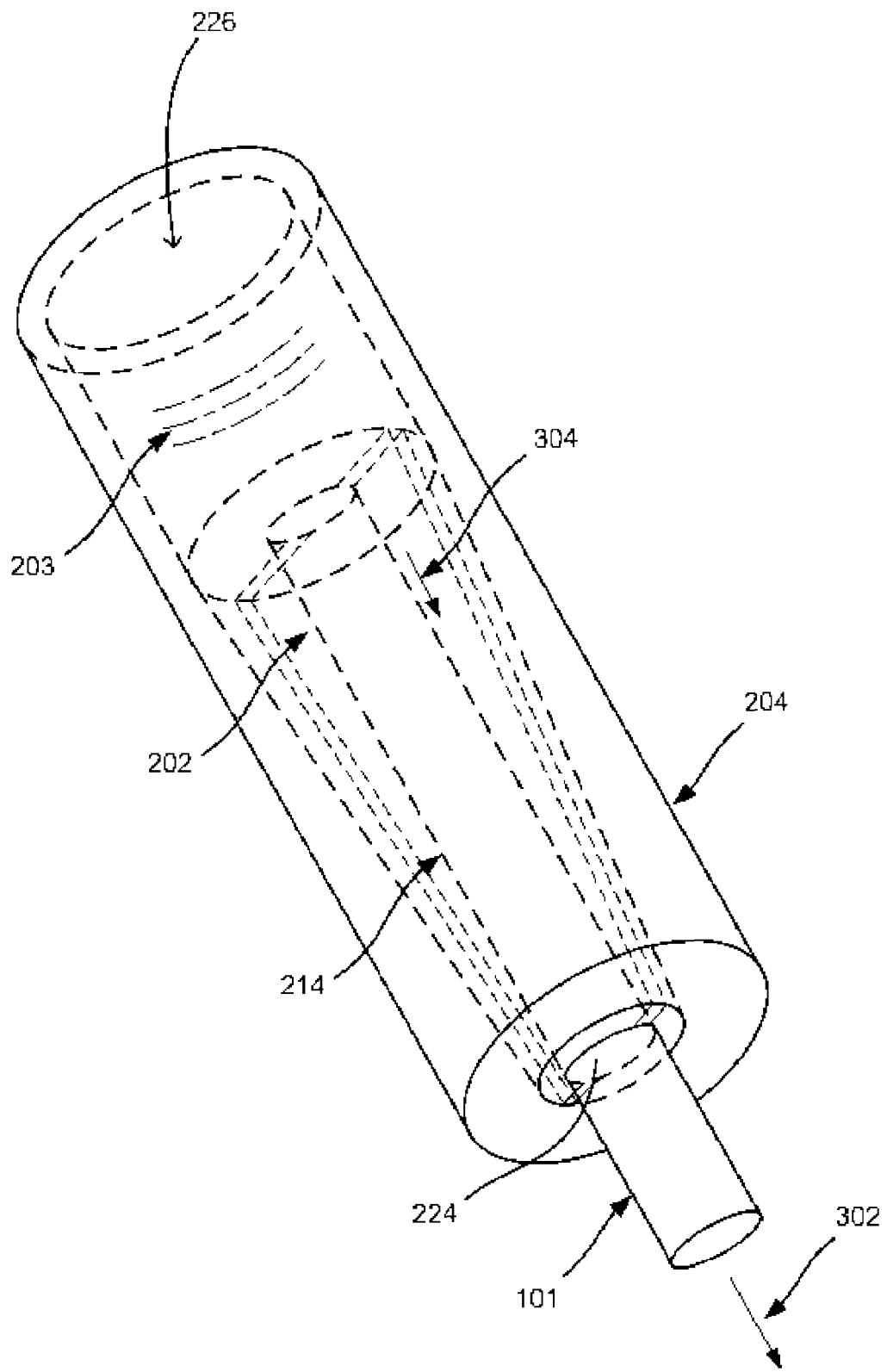
FIG. 3 is a three-dimensional view of a collet and a collet housing according to the present invention.

The compression screw 206 is the threaded implement that can engage the grooves 203 as shown in FIG. 3 in the collet housing 204. While a screw 206 is shown, the compression implement 206 may also be a nut, which is an independent element from the connecting device 218. The compression screw 206 or compression nut 206 can have a hollow center 216 or a hollow cavity. This hollow center or cavity 216 can allow the composite core 101 to pass through the compression nut 206 or into the compression screw 206. The compression screw 206 can have a series of threads along the outside surface of the screw 206. These threads can attach the screw 206 to the collet housing 204, which has related grooves along the inside surface of the housing 204. As will be evident to one skilled in the art, the threads on one side of the connecting device 218 may rotate in the opposite direction (counterclockwise) from the threads on the other side of the connecting device 218. This configuration of the threads allows the connecting device 218 to be screwed into both collet-type fittings 201 simultaneously. By tightening the compression screw 206, a compressive force is applied to the collet 202. This compressive force causes a compressive and frictional area of contact between the collet 202 and the composite core 101. The frictional contact extends along the length of the lumen 214 and the composite core 101 that is placed inside the lumen 214. It is the compressive and frictional forces that hold the composite core 101 in the collet 202. The edge of the lumen at the first end 220 may have a chamfer or bevel to prevent any force concentration at the end of the collet 202.

Figure 7A:
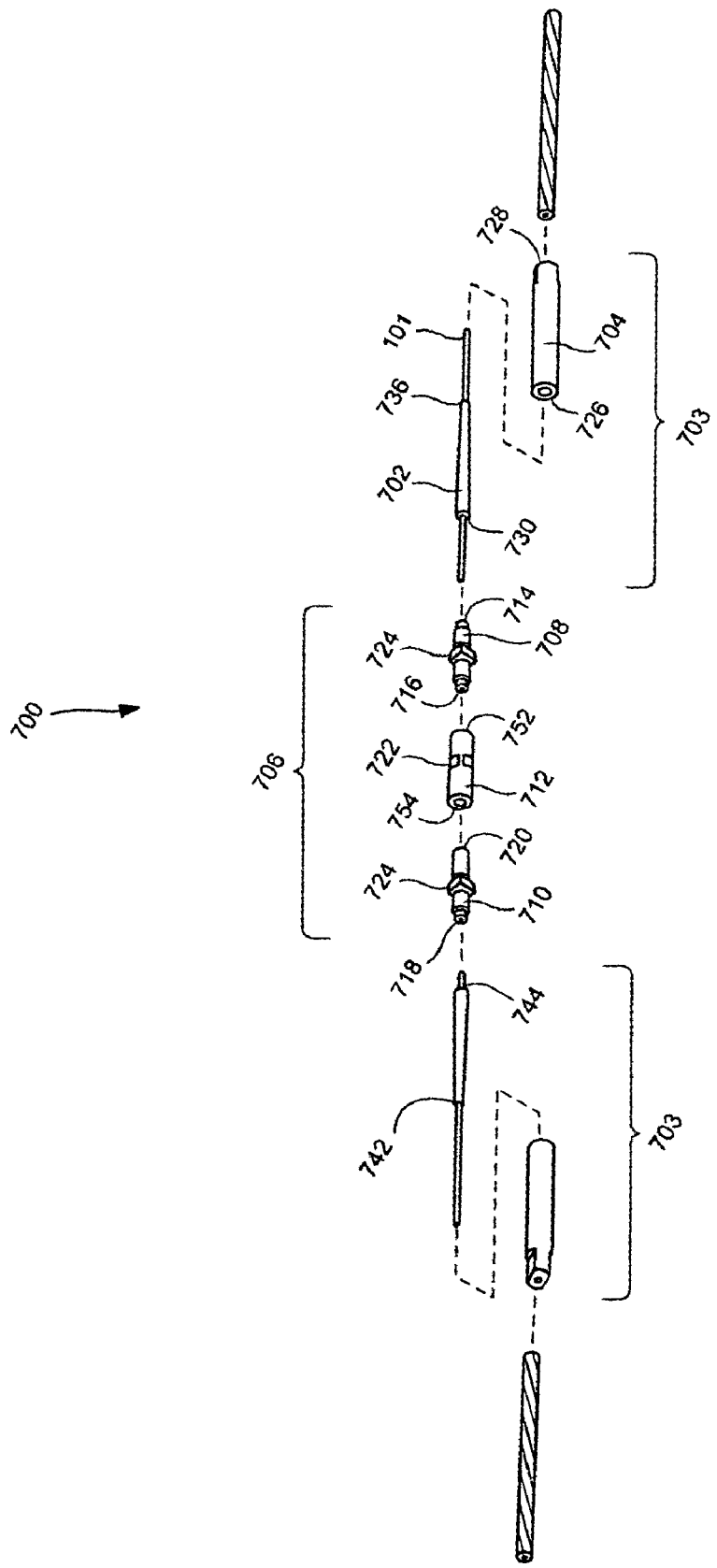
FIG. 7A shows an exploded view of one embodiment of a collet-type splice and its corresponding elements.
Figure 7B:
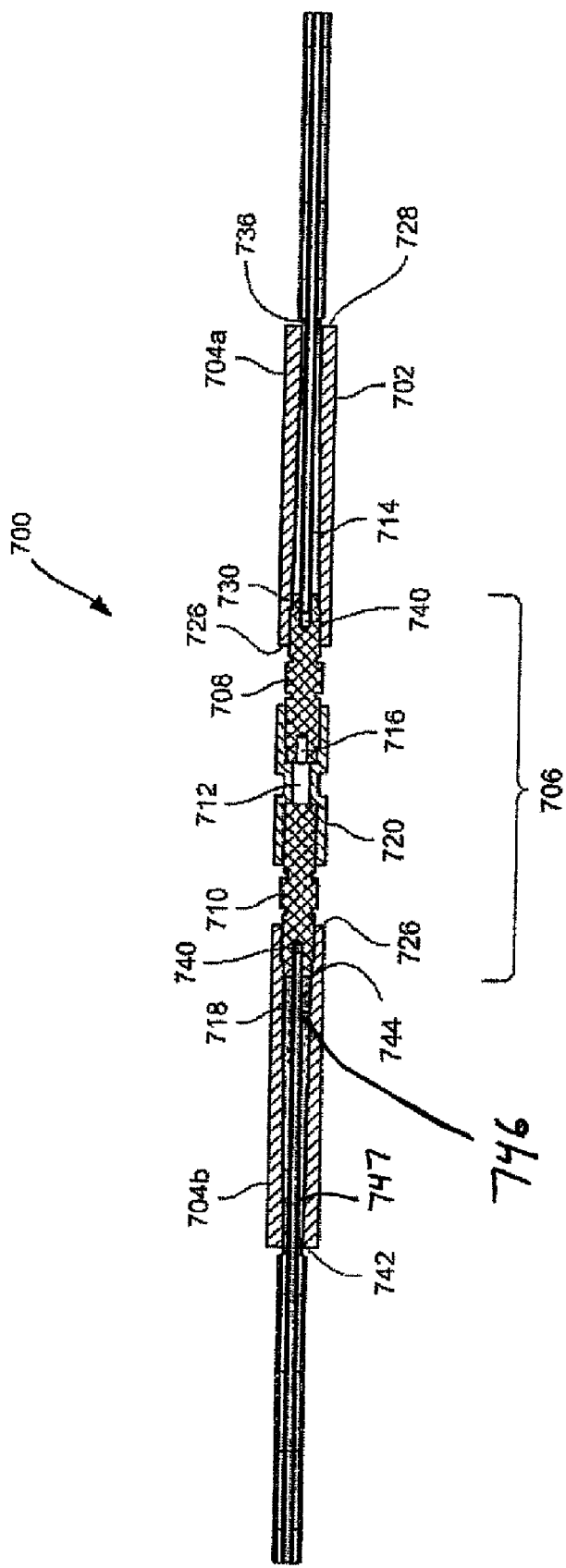
FIG. 7B shows a cross sectional view of the exploded embodiment shown in FIG. 7A the corresponding elements fit together.

An alternate embodiment of a collet-type splice is shown in FIG. 7A and FIG. 7B. In this embodiment, the collet-type splice 700 includes two collet-type fittings 703 coupled by a connecting device 706. In this embodiment, the collet-type fitting 703 includes at least, a collet 702 and a collet housing 704. As previously described, the collet-type fitting 703 may also include an aluminum filler sleeve (not shown) and the collet type splice 700 may include an aluminum housing (not shown), which may cover the two collet-type fittings 703 and the connecting device 706.

In various embodiments, the connecting device 706 may comprise any type of fitting that functions to couple the two collet-type fittings 703 together while exerting forces to seat the collet 702 within the collet housing 704. For example, in one embodiment (not shown), the fitting does not comprise a threaded configuration. In this type of embodiment, a fitting may comprise a first fitting and a receiver fitting. The first fitting may be configured to comprise a fur tree like configuration consisting of a triangular configuration having a pointed end downstream of a series of at least one equilaterally located cutouts terminating in a series of points, wherein the points mimic a tree like configuration. A receiver fitting may be designed to receive the fur tree like configuration, such a receiver fitting comprising a triangular configuration having a series of equilateral cutouts to receive the points on the first fitting. In contrast to a threaded fitting, the first fitting snaps or fits into the receiver fitting.

Referring now to FIG. 7A, in an alternate embodiment, the connecting device 706 comprises a coupling housing retainer 708, a housing coupling retainer 710 and a coupling implement 712. In this embodiment, the housing coupling retainer 710 and the coupling housing retainer 708 are threaded such that unidirectional tightening of the coupling implement 712 will simultaneously cause tightening of the collet housings 704 on both sides of the coupling implement 712, effectively coupling the two ends of the composite core 101. Each component of the connecting device 706 will be described in turn.

In various embodiments, the shape of the coupling housing retainer 708 may comprise any of a plurality of configurations that enable one end to seat within the collet housing 704 and an opposite end to seat within the coupling implement 712. Referring to FIG. 7A, in this embodiment, the coupling housing retainer 708 comprises a cylindrical configuration having a first end 714, a second end 716, and a middle portion 724. In this embodiment, the first end 714 and the second end 716 are configured into a dog point configuration wherein, each dog point end is threaded in the same direction. Further, the middle portion 724 may provide a hold to aid in tightening.

Similarly, in various embodiments, the shape of the housing coupling retainer 710 may comprise any of a plurality of configurations that enable one end to seat within the collet housing 704 and an opposite end to seat within the coupling implement 712. Referring to FIG. 7A, in this embodiment, the housing coupling retainer 710 comprises a cylindrical configuration having a first end 720, a second end 718 and a middle portion 724. The first end 720 comprises a cylindrical configuration threaded opposite that of the second end 716 of the coupling housing retainer 708. The second end 718 is configured into a dog point configuration threaded opposite that of the first end 720 of the housing coupling retainer 710. The first end 720 is configured to seat within the coupling implement 712, while the second end 718 is configured to seat within the collet housing 704.

In various embodiments, the coupling implement 712 may comprise any plurality of configurations that enables tightening between the housing coupling retainer 710 and the coupling housing retainer 708. Referring to FIG. 7A for example, the coupling implement 712 comprises a cylindrical configuration having a first end 732, a second end 734, and a middle portion 722. The first end 732 is threaded to receive the second end 716 of the coupling housing retainer 708. The second end 734 is threaded to receive the first end 720 of the housing coupling retainer 710.

According to this embodiment, first and second ends 714 and 716 of the coupling housing retainer 708 are configured the same way and may be inserted into either the collet housing 704 or the coupling implement 712. In contrast, according to this embodiment, the first and second ends 720 and 718 of the housing coupling retainer 710 are threaded opposite each other such that the second end 718 may only be inserted into the collet housing 704 and the first end 720 may only be inserted into the coupling implement 712.

In this embodiment, to couple the collet-type fittings 703 together, the appropriate ends of the coupling housing retainer 708 and the housing coupling retainer 710 are inserted into the collet housing 704 and the coupling implement 712. The coupling implement 712 is tightened using middle portion 722, creating the collet-type splice as illustrated in FIG. 7B. As illustrated, turning the coupling implement 712 in one direction tightens both the coupling housing retainer 708 and the housing coupling retainer 710 due to the directional threading of the coupling housing retainer 710 and the housing coupling retainer 708.

Referring still to FIG. 7B, the collet 702 is similar to the collet as described previously. In this embodiment, each collet 702 comprises a lumen 730 in which to receive the composite core 101. To form the splice, the composite core 101 is inserted into the collet 702. The collet 702 and the core 101 are further inserted into the collet housing 704, the collet housing 704 having a first end 728 towards the cable and a second end 726 towards the connecting device 706. For purposes of this description, although the collet housing 704 is the same on either side of the splice, the two collet housings 704 in FIG. 7B are referred to as 704a and 704b so as to distinguish between coupling between the coupling housing retainer 708 and the housing coupling retainer 710.

The second end 726 of the first collet housing 704a receives the first end 714 of the coupling housing retainer 708 and the second end 726 of the second collet housing 704b receives the second end 718 of the housing coupling retainer 710. The housing coupling retainer 710 and the coupling housing retainer 708 further comprise a lumen 740 that extends at least partially through each retainer 708, 710 to receive a portion of the composite core 101. The second end 716 and the first end 720 are inserted into the coupling implement 712 and the coupling implement is tightened in one direction to form the splice.

Referring still to FIG. 7B, each collet 702 comprises a first end 742 towards the cable 100 and a second end 744 towards the connecting device 706. The first end 742, comprises a cone like configuration or nose region 736. The nose region 736 may further comprise a polished exterior surface to facilitate seating of the collet 702 within the housing 704.

The design of the collet 702 and the collet housing 704, including both the texture of the interior and exterior surfaces and the configuration of each of the elements, provides for a progressive grip to hold the composite core 101 without penetrating or weakening the core 101. In general, the forces are stronger towards the connecting device 706 and the grip is released towards the first end 728 or cable side of the collet housing 704. In various embodiments, the collet 702 comprises a lumen to receive the composite core 101, wherein the lumen extends between the first end 742 and the second end 744 of the collet 702. The interior surface of the lumen, the surface that contacts the composite core 101, may be graded from rough 746 at the second end 744 or connector side to smooth 747 at the first end 742 or cable side. In addition, the collet 702 may further comprise a single cone shaped piece having one or more slits cut into the length of the sides. The slits introduce some flexibility into the collet 702 such that when pressure is applied by the connecting device 706 the collet 702 grips the outer surface of the core 101. In addition, the outer surface of the collet 702 may further comprise a polished or smooth nose region 736. The smooth surface of the nose region 736 of the collet 702 allows the core 101 to stretch into the collet 702 and move longitudinally inside the collet 702 at the nose region 736. Further, the smooth surface of the collet 702 at the nose region 736 enables the collet 702 to extend past the first end 728 of the collet housing 704 which further forces stretching of the core 101 within the collet housing 704. These forces ensure that the composite core 101 does not slip out of the collet 702 when the tension increases.

As shown in FIG. 3, the tension in the cable 100 pulls the composite core 101 in the direction of arrow 302. An area of friction is developed along the lumen 214 between the composite core 101 and the collet 202. As the tension pulls the composite core 101 in the direction of the arrow 302, the composite core 101, connected to the collet 202 by the frictional area of contact, pulls the collet 202 further down into the collet housing 204, as is represented by arrow 304. The conical shape of the collet 202 and the funnel shape of the collet housing 204 create increased compression upon the composite core 101 because of the decreasing volume within the collet housing 204 in the direction of arrow 304. Thus, the frictional force increases proportionally with the increase in the compressive forces, which increase proportionally with the increase in tensional forces. The increased frictional force ensures that the composite core 101 does not slip out of the collet 202 when the tension increases.

Another possible component of the collet-type fitting 201 is an aluminum filler sleeve 208. The aluminum filler sleeve 208 can be inserted between the aluminum housing and the aluminum conductor 106 of the aluminum conductor composite core reinforced cable 100. This aluminum filler sleeve 208 is required if the collet housing 204 and the collet 202 need a larger outside diameter than the outside diameter of the aluminum conductor composite core reinforced cable 100. A larger outside diameter of the collet housing 204 allows the slope of the collet 202 to be steeper and less likely to be forced out of the collet housing 204 when pulled into the end of the collet housing 204. The aluminum filler sleeve 208 may be any shape to mate between the aluminum housing 210 and the aluminum conductor composite core reinforced cable 100. In the exemplary embodiment, the aluminum filler sleeve 208 is a tube. This aluminum filler sleeve 208 may be made from any conductive material. In the exemplary embodiment, the aluminum filler sleeve 208 is made from aluminum to match the conductor strands 106 wrapping the aluminum conductor composite core reinforced cable 100 and the aluminum housing 210. The aluminum filler sleeve 208 allows the electrical current to pass through the aluminum filler sleeve 208, into the aluminum housing 210, and into the next cable 100. The aluminum filler sleeve 208 may be crimped to the cable 100 using standard crimping techniques with forces that would not damage the composite core 101.

The collet-type fitting 201 may also include an aluminum housing 210. The aluminum housing 210 refers to any structure that functions as an electrical jumper between the first cable 100a and the second cable 100b. An aluminum housing 210 conducts and passes the electric current from one cable 100 to another. In one embodiment, the aluminum housing 210 may be a cable 100 that is crimped to the conductors 106 of the first cable 100a and the second cable 100b. In an exemplary embodiment, the aluminum housing 210 is another hollow cylinder or tube that can be slipped over the entire splice and contact the conductors 106 on both the first cable 100a and second cable 100b. The aluminum housing 210 may be any electrically conductive material that can carry the electric current from the first cable 100a, over the splice 200, to the second cable 100b. In the exemplary embodiment, the aluminum housing 210 is made from aluminum similar to that in the conductor strands 106 in the aluminum conductor composite core reinforced cable 100. The aluminum housing 210 may be crimped to both the first cable 100a and the second cable 100b using standard crimping techniques with forces that would not damage the composite core 101. This embodiment of the aluminum housing 210 is shown in FIG. 2 and is only exemplary.

The aluminum housing 210 may have various cross-sectional areas. In one embodiment, the cross-sectional area of the aluminum housing 210, at some point along the length of the aluminum housing 210, exceeds the cross-sectional area of the conductors 106 on the cables 100. For instance, the cross-sectional area of the aluminum housing 210 may be twice the cross-sectional area of the cable conductors 106. By increasing the cross-sectional area of the aluminum housing 210, the operating temperature of the aluminum housing 210 can be kept lower than the cable conductors 106. This improved heat dissipation may effectively improve the longevity of the connection.

Figure 10:
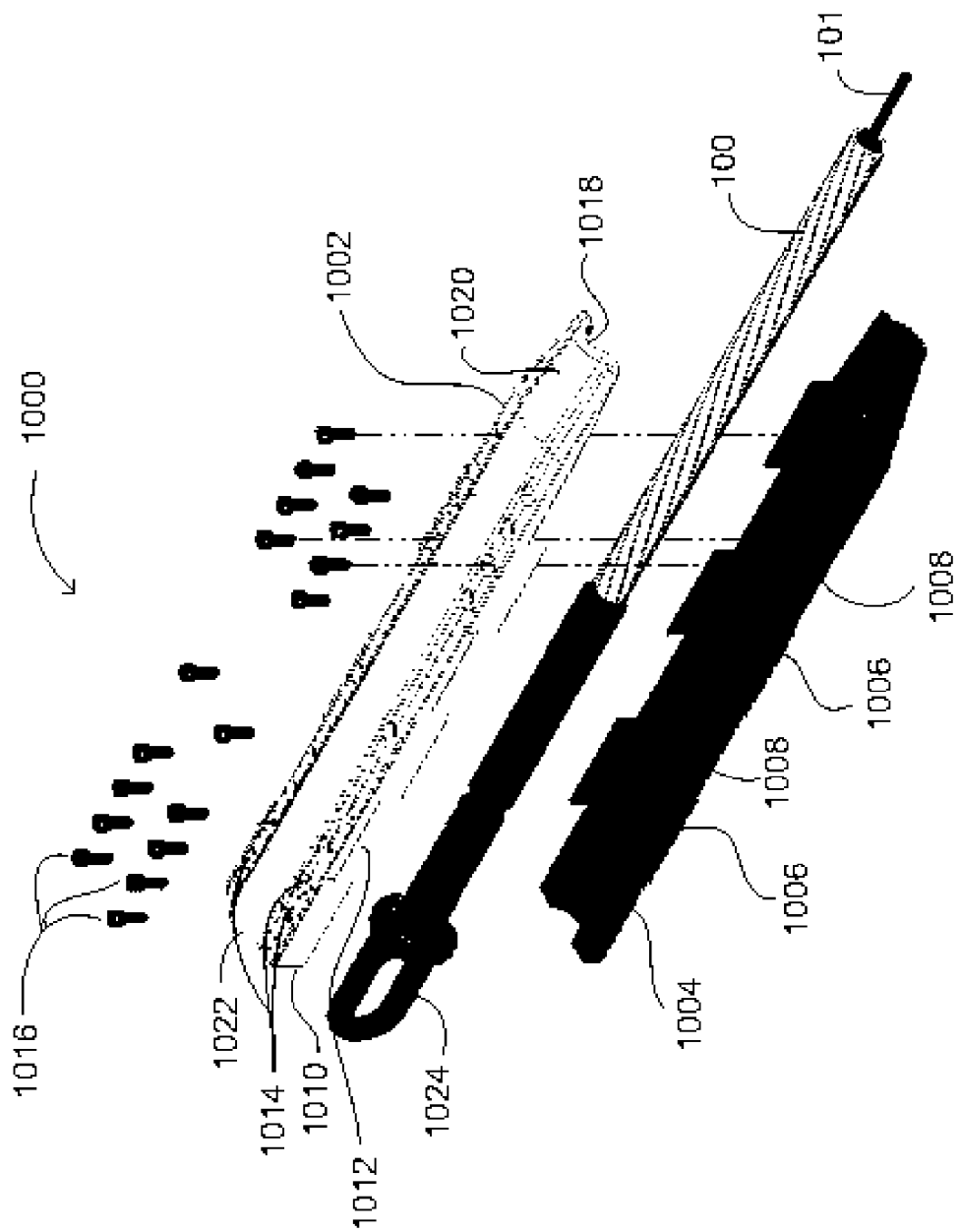
FIG. 10 shows an exploded view of one embodiment of a housing for a collet-type dead end and its corresponding elements.

FIG. 10 illustrates an alternate embodiment of an aluminum housing 1000 comprising a top portion 1002 and a bottom portion 1004 and one or more fastening devices 1016. The top portion 1002 further comprises one or more edge pieces 1010 and gaps 1012 that are designed to interlock with complementary edge pieces 1006 and gaps 1008 of bottom portion 1004. The cable side 1018 of each the top 1002 and bottom 1004 portions may further comprise a tapered nose region 1020 to ensure a tight fit between the housing 1000 and the cable 100. The tapered nose region 1020 helps to ensure an effective junction to carry electricity across the dead end or splice and further provides a barrier to environmental factors from penetrating within the housing 1000. It is noted that although the drawing refers to a dead end, one of skill in the art will recognize that the housing 1000 may also be adapted for a splice configuration.

In this embodiment, the top 1002 and bottom 1004 portions interlock to form the housing 1000. For example, edge piece 1010 fits into edge gap 1008 and edge piece 1006 fits into edge gap 1012 of the top portion 1002. The top 1002 and bottom 1004 portions further comprise at least one hole 1014 to receive one or more fastening devices 1016. In FIG. 10, the fastening devices are bolts, however, the fastening devices may comprise any device that effectively holds the top 1002 and bottom 1004 portions together. The housing 1000 abuts the connector 1024 at the connector end 1022 of the housing 1000.

Figure 11:
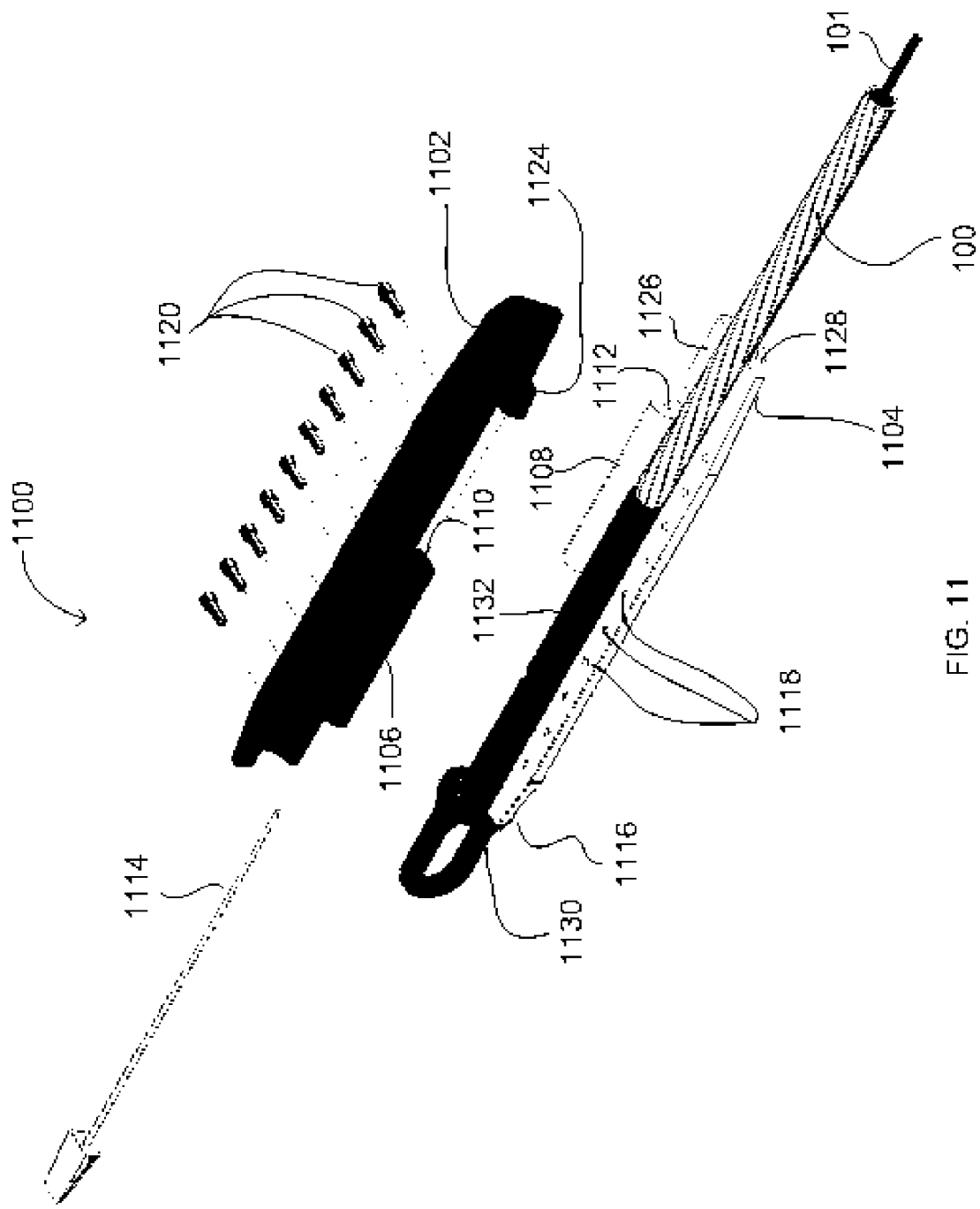
FIG. 11 shows an exploded view of one embodiment of a housing for a collet-type dead end and its corresponding elements.

In an alternate embodiment, the top 1002 and bottom 1004 portions may comprise a hinge system wherein the housing would function as a clam shell. This type of embodiment is illustrated in FIG. 11, wherein the housing 1100 comprises a top portion 1102 and bottom portion 1104. The top 1102 and bottom 1104 portions further comprise hinge portions 1106 and 1108. The hinge portions 1106 and 1108 each further comprise at least one passageway 1110 and 1112 to receive at least one hinge pin 1114. The opposite side 1116 of the top 1102 and bottom 1104 portions each further comprise one or more holes 1118 to receive one or more fastening devices 1120.

In this embodiment, the cable 100 is inserted between the top 1102 and the bottom 1104 portions. Hinge portions 1106, 1108, 1124 and nose region 1126 interlock and align to receive the at least one pin 1114 within holes 1110 and 1112. Once the hinge is engaged, the top portion 1102 folds over the cable to abut the bottom portion 1104. The one or more fastening devices 1120 are inserted into the one or more holes 1118 and tightened to achieve a substantial connection with the cable. In various embodiments, the cable side 1128 and the dead end side 1130 of the housing 1100 may be either blunt (not shown) or tapered having a nose region 1126 as shown. In addition, although the housing 1100 is discussed in reference to a dead end fitting, one of skill in the art will recognize that the housing may be applied to a splice configuration.

A Method to Splice

Figure 5:
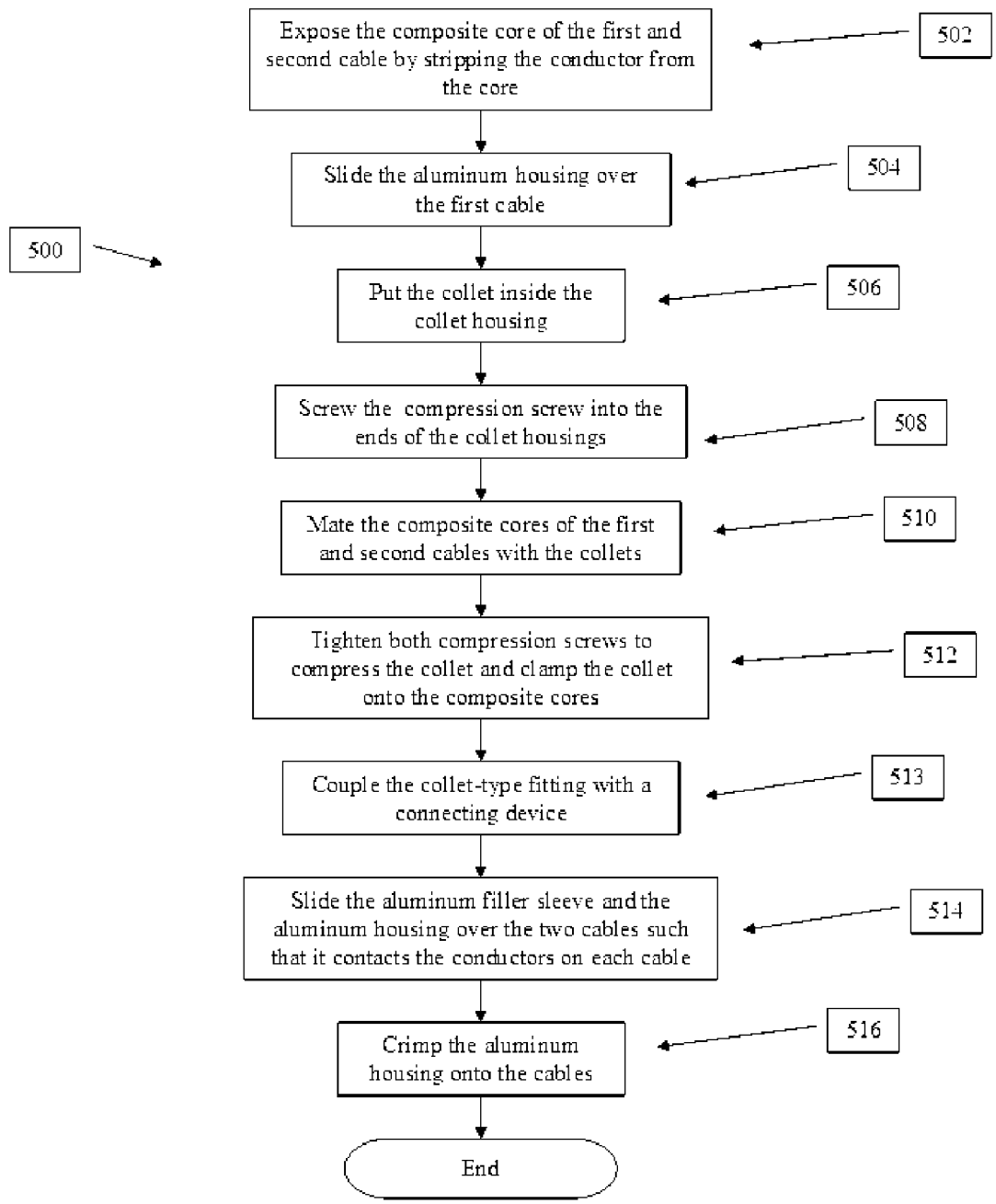
FIG. 5 shows one embodiment of a method for splicing two composite core cables according to the present invention.

One embodiment of the method 500 to splice two aluminum conductor composite core reinforced cables 100 is shown in FIG. 5. First, the composite core 101 of the first cable 100a and second cable 100b can be exposed 502 by stripping away the conductors 106 encasing the composite cores 101. Stripping the conductors 106 may be done by a stripping tool. These tools and methods of stripping wire are well known in the art and will not be explained further.

The collet 202 may be inserted 506 into the collet housing 204 and an aluminum filler sleeve may be slipped over the conductor of each cable 100. The aluminum housing 210 may also be slipped 504 over one of the cables 100. This step should be completed before the collet-type fittings 201 are coupled. Once the fittings 201 are coupled, the only method of putting on the aluminum housing 210 would be to slip it over the entire length of one of the cables 100 until it reaches the splice. However, other embodiments of the aluminum housing 210 may be placed over the splice later in the process.

The composite cores 101 can then be inserted 510 into the lumen 214 of the collet 202. Inserting the composite cores 101 entails the slipping of the cores 100 into their respective lumen 214. The core 100 may not reach the end of the collet 202 or may extend beyond the end of the collet 202.

To create the compression fit and frictional hold on the composite core 101, the collet 202 is compressed. The compression implement 206 is used to squeeze the collet 202 into the collet housing 204. In the exemplary embodiment, the compression screw 206 is threaded 508 into the collet housing 204 and then tightened 512, which presses the collet 202 further into the collet housing 204. The collet 202 tightens around the composite core 101 along the length of the composite core 101 inserted into the collet 202. Threading the screw 206 into the collet housing 204 can be done before mating the composite core 101 with the collet 202. The collet 202 in turn applies compressive forces on the composite core 101 of each cable 100.

In one embodiment, the aluminum filler sleeve 208 can be placed between the aluminum housing 210 and the cable conductors 106. The aluminum filler sleeve 208 and the aluminum housing 210 may be crimped 516 onto one or both of the cables 100. The crimping of the aluminum housing 210 ensures that it will not migrate from its position over the splice 200. In other embodiments, the aluminum filler sleeve 208 and the aluminum housing 210 may be welded to one or both conductors 106 on the two cables 100. In still another embodiment, the aluminum filler sleeve 208 and the aluminum housing 210 may be glued or adhesively attached to a cable 100. Once attached, the aluminum housing 210 can carry electric current over the splice 200, with help from the aluminum filler sleeve 208.

An exemplary composite core 101 with a diameter of 0.371 inches, may withstand compressive forces of about 10,000 psi. When the collet 202 is compressed by the compression screw 206, the compressive forces should be below the compression limit of the composite core 101. Thus, the collet 202 should be compressed to less than about 10,000 psi. In an exemplary embodiment, the collet 202 is compressed to 4,000 psi for a splice 200 on an aluminum conductor composite core reinforced cable 100 that replaces a Drake style ACSR conductor. These calculations are only exemplary but generally follow the calculations presented above.

An electrical cable 100 must be able to maintain adequate tension. The tension in the line functions to reduce sag in the line. As a standard, tension in most Drake style ACSR cables is around 40,000 pounds. However, the present invention allows higher tension loads along the splice 200. The splice 200 can handle tensions of around 43,000 pounds. Thus, the splice 200 maintains a three (3) times safety factor. In addition, the collet-type splice 200 increases the tension if the composite core 101 begins to slip from the splice 200 and pulls the collet 202 further into the collet housing 204.

Other configurations of the above elements is contemplated and included in the invention. In addition other elements may be added to the splice 200 and are include in the invention.

Dead End Fittings

Figure 4A:
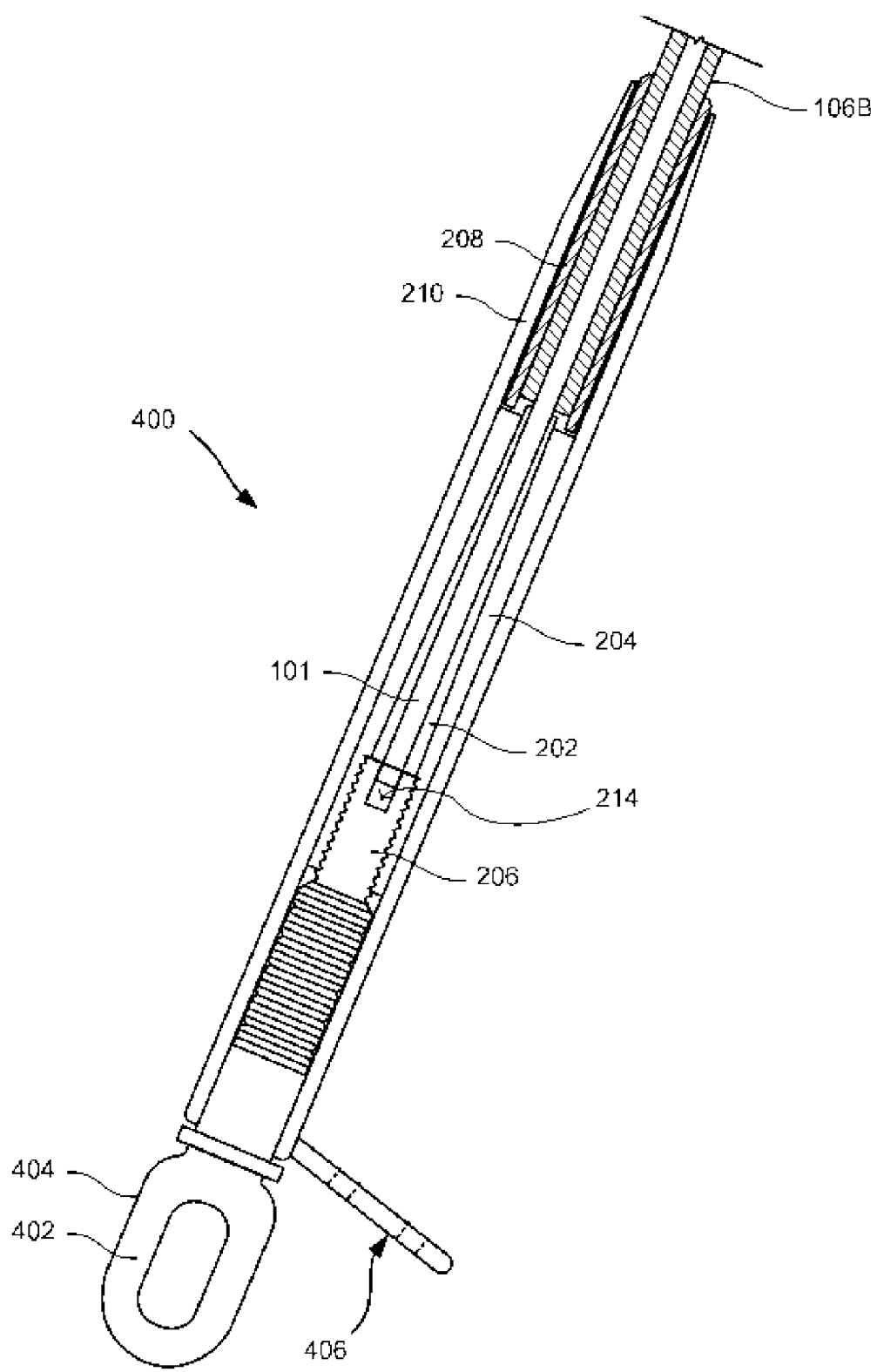
FIG. 4A through FIG. 4B are cross-sectional views of one embodiment of a collet-type dead end and some of its corresponding elements according to the present invention.
Figure 4B:
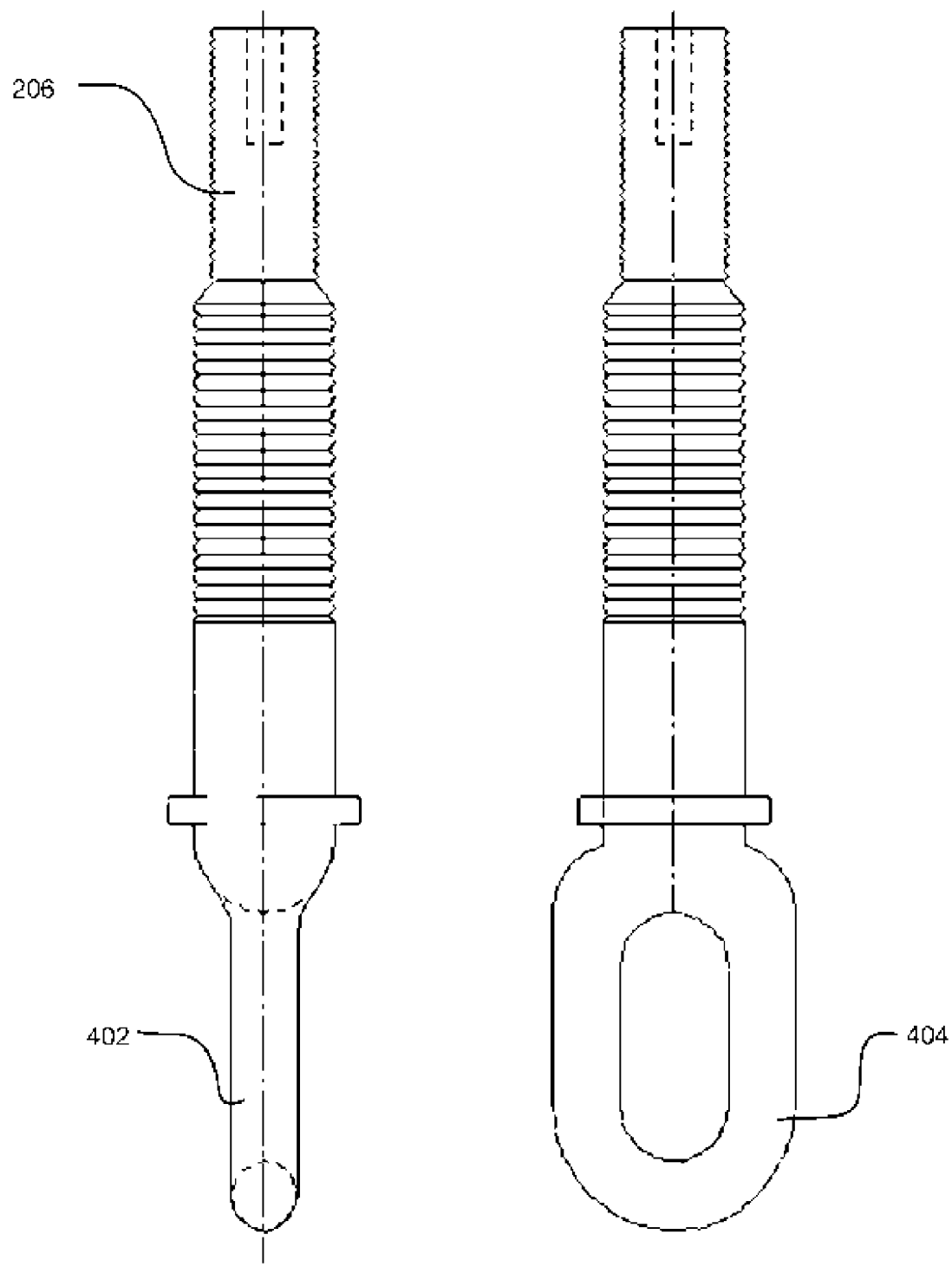

The present invention also relates to dead ends 400, as shown in FIG. 4A and FIG. 4B, used to terminate the aluminum conductor composite core reinforced cables 100 described herein. As explained, the main load bearing element of the aluminum conductor composite core reinforced cable 100 is the composite core 101. Therefore, it is advantageous to have a dead end 400 that can hold the composite core 101 of the aluminum conductor composite core reinforced cable 100. The dead ends 400 are similar and function similarly to the splice fittings 200. One skilled in the art will recognize the similarities and how to modify a collet-type fitting 201 to function in a dead end 400. Therefore, the collet-type fitting 201 will not be explained again as it relates to dead ends 400. Rather, the differences between the splice 200 and the dead end 400 will be explained hereinafter.

One embodiment of the collet-type dead end 400 is shown in FIG. 4A and FIG. 4B. In this embodiment, the collet-type dead end 400 may include, but is not limited to, a collet 202, a collet housing 204, a connector 404, and at least one compression implement 206. In the embodiment shown, the compression implement 206 and the connector 404 are formed as a single piece. In further embodiments, the collet-type dead end 400 may also include an aluminum filler sleeve 208 and an aluminum housing 210. These elements of the collet-type dead end 400 function to mate with the composite core 101 of the aluminum conductor composite core reinforced cable 100, compress the collet 202 such that friction holds onto the composite core 101 and anchor the dead end 400 to a structure.

A component of the collet-type dead end 400 may be a connector 404. The connector 404 may be any mechanical device that anchors the dead end 400 and the cable 100 to a structure. In the embodiment shown, the connector 404 is an eye bolt or clevis. In other embodiments, the connector 404 may include, but is not limited to, hooks that can be set in a hole, plates that can be screwed to a set of bolts, or bolts that can screw to a female mate. One skilled in the art will recognize the various types of connectors 404 that may be used. All of the connectors 404 are incorporated into this invention. Hereinafter, the connector 404 will be described as an eye bolt 402, but the description is not meant to limit the invention to that one embodiment.

The eye bolt 402 may be formed with the compression screw 206 and thread into the collet housing 204. By screwing into the threads of the collet housing 204, the eye bolt 402 may be incorporated into the mechanical couple with the cable 100. Thus, when the eye bolt 402 is anchored to a structure, the components that hold the cable 100 are also anchored. The eye bolt 402 can be anchored to any type of structure. The structure may include, but is not limited to, a pole, a building, a tower, or a substation.

The cables 100 and the collet-type dead end 400, once completely mated, form a cable terminal 400. After the cable terminal 400 is made, an electrical jumper 406 may be installed, and the electrical circuit connected to the end user using the jumper 406.

Figure 8A:
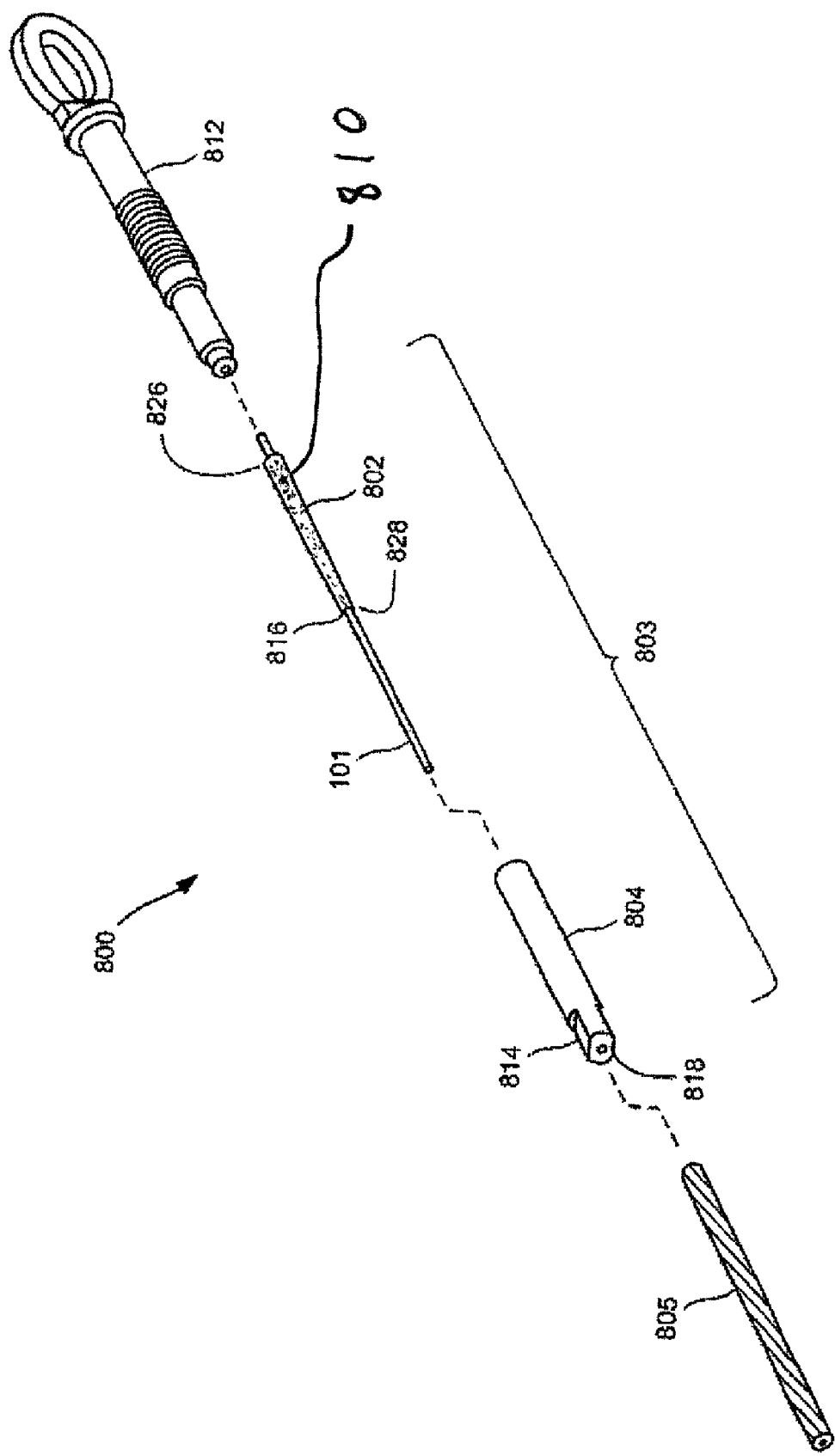
FIG. 8A shows an exploded view of one embodiment of a collet-type dead end and its corresponding elements.
Figure 8B:
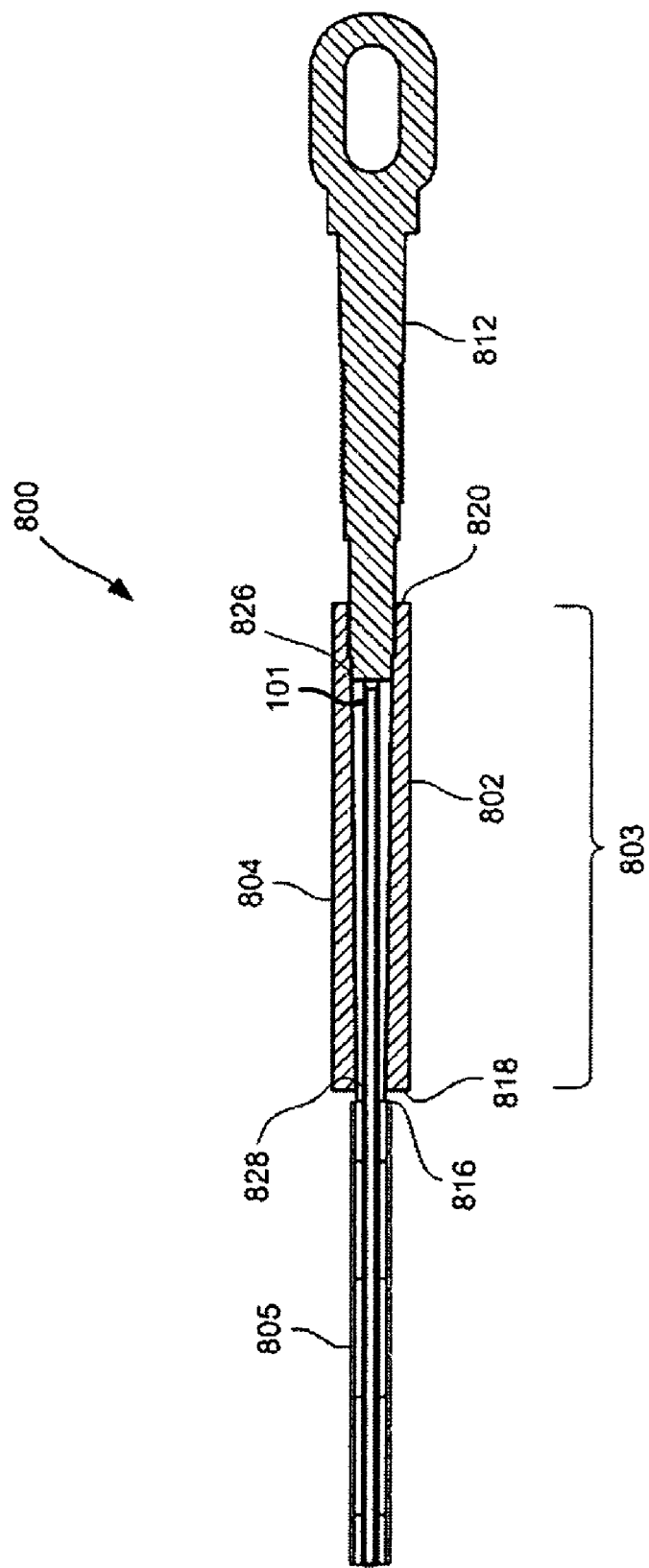
FIG. 8B shows a cross sectional view of the exploded embodiment shown in FIG. 8A the corresponding elements fit together.

An alternate embodiment of the collet-type dead end 800 is shown in FIG. 8A and FIG. 8B. The embodiment of the collet-type dead end 800 includes a collet-type fitting 803 and a connector element 812. In this embodiment, the collet-type fitting 803 includes at least, a collet 802 and a collet housing 804. As previously described, the collet-type fitting 803 may also include an aluminum filler sleeve (not shown) and an aluminum housing (not shown), which may cover the collet-type fitting 803 and the connector 812.

In various embodiments, the connector element 812 may comprise any element that functions to seat the collet 802 within the collet housing 804 at one end, and anchor the collet-type fitting 803 to a structure. In one embodiment, for example, the connector element 812 is an eyebolt as illustrated in FIG. 8A and FIG. 8B, wherein the eyebolt may comprise any of a plurality of materials strong enough to support the cable 100. Preferably, the connector element 812 comprises a material that is resistant to rust, such as stainless steel. The connector element 812 may further comprise a nose region 822 on the end 824 that seats within the collet housing 804. The nose region 822 functions to appropriately seat the collet 802 within the collet housing 804.

The collet-type dead end 800 functions similarly to the collet-type splice 700 to grip the composite core 100. In particular, the connector 812 compresses the collet 802 within the collet housing 804 such that friction holds onto the composite core 101. Similar to the collet-type splice 700, the design of the collet 802 and the collet housing 804 provides for a progressive grip to hold the composite core 101 without penetrating or weakening the core 101. Each collet 802 comprises a first end 826 towards the connector and a second end 828 towards the cable. The second end 828 comprises a cone like configuration or nose region 816. The nose region may further comprise a polished exterior surface to facilitated seating of the collet 802 within the collet housing 804. In general, the forces are stronger towards the first end 826 and the grip is released towards the second end 828 or cable side of the collet 802.

In various embodiments, the collet 802 comprises a lumen to receive the composite core 101 wherein the lumen extends between the first end 826 and the second end 828. The interior surface of the lumen, the surface that contacts the composite core, may be graded from rough towards the first end 826 to smooth towards the second end 828. In addition, the collet 802 may comprise a single cone shaped piece having one or more longitudinally oriented slits cut into the length of the sides. The slits introduce some flexibility into the collet 802 such that when pressure is applied by the connector element 812 the collet 802 grips the outer surface of the core 101. In addition to the interior surface of the collet 802 gripping the core 101, the outer surface of the collet 802 may further comprise a polished or smooth nose region 816. The smooth surface of the nose region 816 of the collet 802 allows the core 101 to stretch into the collet 802 and move longitudinally inside the collet 802 at the nose region 816. The smooth surface of the collet 802 at the nose region 816 enables the collet 802 to extend past the end 818 of the collet housing 804 which further forces stretching of the core 101 within the collet housing 804. These forces ensure that the composite core 101 does not slip out of the collet 802 when the tension increases.

In a further embodiment, the exterior surface of the collet 802 may comprise a series of grooves or textures 810 and the interior surface of the collet housing 804 may comprise a smooth polished surface. The rough exterior surface of the collet 802 reduces the surface area of the exterior surface in contact with the interior surface of the collet housing 804. In addition, the polished interior surface of the collet housing 804 facilitates seating the collet 802 within the housing 804. It will be apparent to one skilled in the art that this type of surface texturing may also be applied to splices.

Referring to FIG. 8B, in this embodiment, to assemble the collet-type dead end, the composite core 101 is inserted into the collet 802. The collet 802 and the core 101 are inserted into the collet housing 804. The connector element 812 is inserted into the first end 820 of the collet housing 804. The end 820 of the collet housing 804 is threaded to receive the connector element 812. As the connector element 812 threads into the collet housing 804, the connector element 812 applies pressure to the collet 802 within the housing 804. This pressure causes the collet 802 to seat within the collet housing 804 and grip the core 101 without penetrating the core 101.

Figure 9:
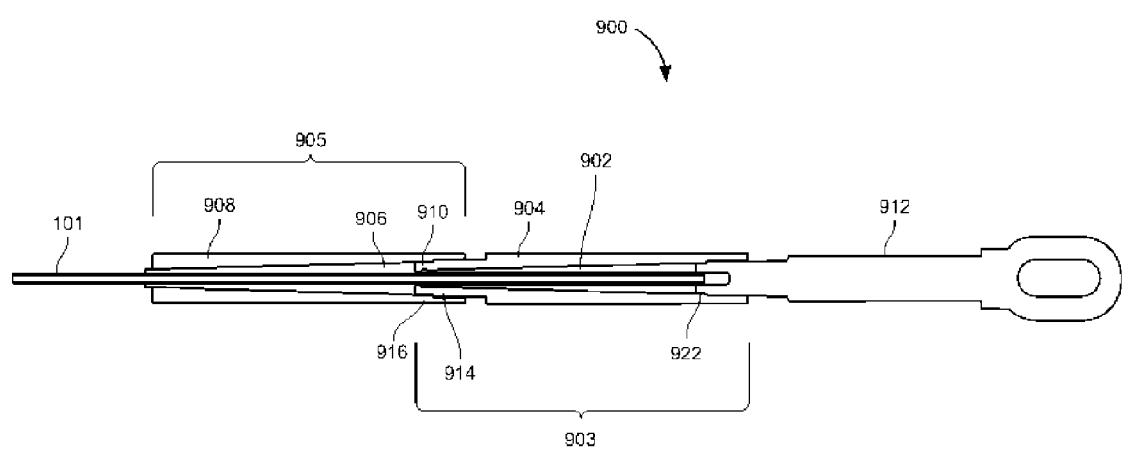
FIG. 9 shows a cross sectional view of one embodiment of an assembled dead end type assembly and its corresponding elements.

In some situations, the dead end may require a more extensive grip. In an alternate embodiment, two or more collet-type fittings may be coupled in succession to achieve a more substantial grip on the composite core. One embodiment of a collet-type dead end is shown in FIG. 9. Although the configuration is modified, the concept of the grip on the core 101 including surface modifications to the elements of the collet-type fittings 903, 905 as described above still may apply to this embodiment. Accordingly, these aspects will not be discussed in detail here.

The embodiment of the collet-type dead end 900 includes a first collet-type fitting 903, a second collet-type fitting 905, and a connector element 912. In this embodiment, the first collet-type fitting 903 includes at least, a collet 902 and a collet housing 904. The second collet-type fitting 905 includes at least, a collet 906 and a collet housing 908. As previously described, the collet-type fittings 903, 905 may also include an aluminum filler sleeve (not shown) and an aluminum housing (not shown), which may cover the collet-type fittings 903, 905 and the connector 912.

In a further embodiment, collet 906 in the second collet-type fitting 905 may comprise a somewhat softer material than the first collet 902. In this embodiment, the second collet 902 may comprise any type of material that has a high melting point with some ability to damp vibrations and provide additional grip or strength to the interface between the core and the second collet-type fitting 905. For example, the collet 906 may comprise a high melting point rubber, various synthetic rubbers based on polychloroprene, a lightweight inflexible polymer type material such as Delrin, or high density polyethylene.

In this embodiment, the connector element 912 comprises an eye bolt. However, the connector element may be any element that couples the collet-type fitting to a structure. The dead end 900 functions similarly to the previously disclosed embodiments. The nose region 922 of the connector element 912 functions to seat the first collet 902 within the first collet housing 904. The structure of the collet housing 904 may further comprise a nose region 910 and an upstream threaded region 914. The upstream threaded region 914 engages threads on the connector side 916 of the interior of the second housing 908. The connector side 916 of the housing 908 receives the threaded region 914 of the first collet housing 904. In addition, the nose region 910 functions to seat the collet 906 of the second collet-type fitting 905 within the collet housing 908.

A Method to Terminate

Figure 6:
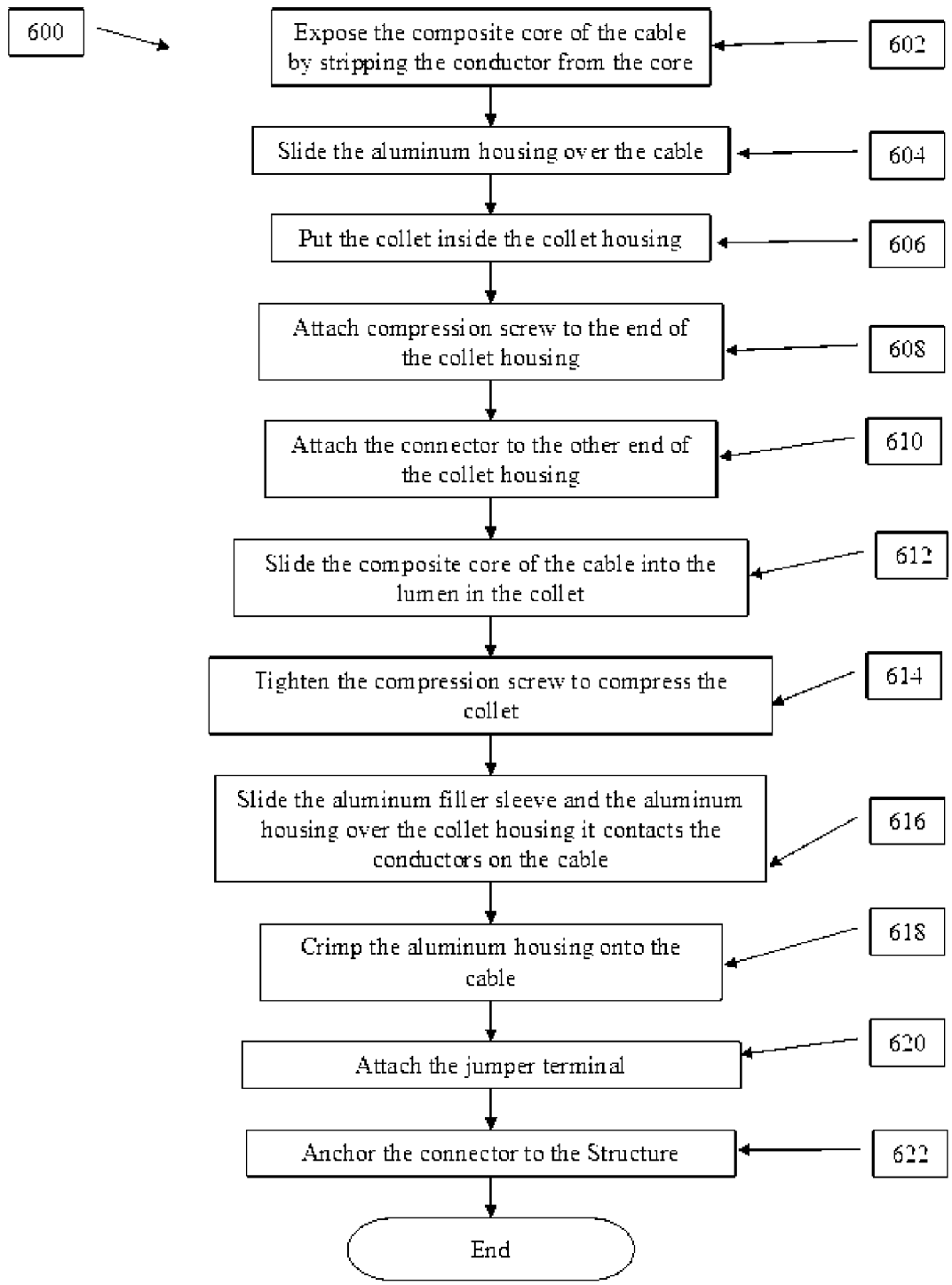
FIG. 6 shows one embodiment of a method for terminating a composite core cable according to the present invention.

One embodiment of the method 600 to terminate an aluminum conductor composite core reinforced cable 100 is shown in FIG. 6. First, the composite core 101 of the cable 100 can be exposed 602 by stripping away the conductor 106 encasing the composite core 101. Stripping the conductor 106 may be done by a stripping tool. These tools and methods of stripping wire are well known in the art and will not be explained further.

The collet 202 may be inserted 606 into the collet housing 204. The aluminum housing 210 may also be slipped 604 over the cable 100. In one embodiment, the aluminum filler sleeve may also be placed over the cable 100. The connector 404 may be attached 610 to the second end 222 of the collet housing 204. The connection can be made by screwing the connector 404 into the end 222 of the collet housing 204. At this point, the collet 204 is prepared to receive the composite core 101. The composite core 101 can be inserted 612 into the lumen 214 of the collet 202. Inserting the composite core 101 entails the slipping of the core 100 into the lumen 214, possibly until the core 100 reaches the end of the collet 202.

To create the compression fit and frictional hold on the composite core 101, the collet 202 is compressed. The compression implement 206 is used to squeeze the collet 202. In one embodiment, the compression screw 206 is threaded 608 into the collet housing 204 and then tightened 914, which presses on the collet 202. The collet 202 in turn applies compressive forces on the composite core 101 of the cable 100.

In one embodiment, the aluminum filler sleeve 208 and the aluminum housing 210 can be slipped 616 over the dead end 400. The aluminum filler sleeve 208 and the aluminum housing 210 may be crimped 616 onto the cable 100. The crimping of the aluminum filler sleeve 208 and the aluminum housing 210 ensures that it will not migrate from its position over the dead end 400. In other embodiments, the aluminum filler sleeve 208 and the aluminum housing 210 may be welded to a conductor 106. In still another embodiment, the aluminum filler sleeve 208 and the aluminum housing 210 may be glued or adhesively attached to the cable 100. Once attached, the aluminum housing 210 can carry electric current over the dead end 400.

In an exemplary embodiment, a jumper terminal 406 may be attached to the aluminum housing 210. In one embodiment, the jumper terminal 406 is bolted to the aluminum housing 210. The jumper terminal 406 may also be welded or adhesively attached to the aluminum housing 210. In still another embodiment, the jumper terminal 406 and the aluminum housing 210 are formed as a single unitary part. One skilled in the art will recognize other methods of attaching the aluminum housing 210 to the jumper terminal 406. The jumper terminal 406 provides a means of connection between the aluminum housing 210 and the end user.

The dead end 400, after the connector 404 and the core 100 are attached, can be anchored 622 to a structure. Anchoring the dead end 400 may include slipping the eye of the eye bolt 404 or clevis over some hook. The structure may be a pole or a building. In one embodiment, the eye is slipped onto a hook; the jumper terminal 406 is connected to a wire that feeds the electrical current into a nearby building. One skilled in the art will recognize other structures to anchor to and other methods of completing such attachments.

We claim:

1. A splice fitting to connect a first electricity transmission cable to a second electricity transmission cable, each cable comprising a composite core surrounded by a conductor, the splice comprising:
    at least two collet-type fittings, each fitting further comprising:
        a collet comprised of one or more sections that form a truncated conical shape, the shape of the collet comprising an outer diameter that increases from a first end to a second end creating an outside slope to slide within a collet housing, the collet further comprising a concentrically oriented lumen, the lumen having a cross section defined by a substantially uniform interior diameter dimensioned to fit a cross section of composite core, the lumen having a length to fit a length of composite core, the lumen having an interior surface configured to prevent substantial penetration into the composite core;
        a collet housing having a first open end to allow the collet to fit into the collet housing and a second open end having a smaller internal diameter than the first open end, the housing having a funnel shaped interior configured to receive the outside slope of the collet and enable compression of the collet and the composite core;
    a connecting device that couples the at least two collet-type fittings to form the splice, wherein the first end of each collet housing is adapted to couple with the connecting device; and
    an aluminum housing that covers the collet-type fittings and the connecting device and electrically connects the conductor of a first cable with the conductor of a second cable.

2. A splice fitting according to claim 1, the second open end of the housing having a diameter to allow a portion of the first end of the collet to extend beyond the second end of the collet housing to facilitate distribution of frictional force between the core and the lumen.

3. A splice fitting according to claim 1, wherein the interior surface of the lumen is graded from rough to smooth.

4. A splice fitting according to claim 1, wherein the first end of the collet comprises a nose region.

5. A splice fitting according to claim 4, wherein the nose region is polished.

6. A splice fitting according to claim 1, wherein the collet comprises an outer surface that is grooved or textured.

7. A splice fitting according to claim 1, wherein the collet is a conical shaped tube comprising one or more longitudinally oriented slits.

8. A splice fitting according to claim 1, wherein the collet housing is a tube comprising a funnel-shaped interior that accepts the collet.

9. A splice fitting according to claim 8, wherein the funnel-shaped interior comprises a polished interior surface to facilitate seating of the collet.

10. A splice fitting according to claim 1, wherein the connecting device comprises more than one part.

11. A splice fitting according to claim 1, wherein the aluminum housing has a greater cross sectional area than the conductor of the first cable and the conductor of the second cable, to lower operating temperatures across the splice.

12. A splice fitting according to claim 1, wherein the aluminum housing is a tube.

13. A splice fitting according to claim 1, further comprising an aluminum filler sleeve between the conductor on the cable and the aluminum housing to ensure that the electrical current is passed by the aluminum housing.

14. A fitting for a cable having a composite core comprising:
    a collet comprised of one or more sections that form a truncated conical shape, the shape of the collet comprising an outer diameter that increases from a first end to a second end creating an outside slope to slide within a collet housing, the collet further comprising a concentrically oriented lumen, the lumen defined by a substantially uniform interior diameter dimensioned to fit a cross section of composite core, the lumen having a length to fit a length of composite core, the lumen having an interior surface configured to prevent substantial penetration into the composite core; and
    a collet housing having a first open end to allow the collet to fit into the collet housing and a second open end having a smaller internal diameter than the first open end, the housing having a funnel-shaped interior configured to receive the outside slope of the collet to enable the collet to slide into the collet housing, the second open end having a diameter to allow a portion of the first end of the collet to extend beyond the second end of the collet housing to facilitate distribution of frictional force between the core and the lumen.

15. A fitting according to claim 14, wherein tension applied to the opposite core in the direction of the second open end pulls the collet into the collet housing applying a compressive force to the collet causing compression of the composite core along the length of the lumen.

16. A fitting according to claim 15, wherein the fitting can be
    connected to at least one more fitting in series to increase the compressive force on the core.

17. A fitting according to claim 14, wherein the fitting further comprises an implement to couple the fitting to another fitting to form a splice, said implement configured to engage with the collet housing of each fitting.

18. A fitting according to claim 14, wherein the collet comprises more than one section each section substantially the same size and shape, configured to fit together to form the collet.

19. A fitting according to claim 14, wherein the fitting further comprises a connector that connects the fitting to a structure to form a dead-end.

20. A fitting according to claim 19, wherein the fitting can be connected to at least one more fitting in succession to achieve a more substantial grip on the composite core.

21. A fitting for a cable having a composite core comprising:
    a collet having an outer surface defining a conical shape comprising an outer diameter that increases from a first end to a second end and an interior surface defining a lumen, the lumen having a substantially uniform interior diameter, the collet constructed of one or more sections that fit together to form the collet, each of the one or more sections defined by one or more longitudinal slits positioned to facilitate compression of the composite core, the interior surface of the lumen configured to prevent substantial penetration into the composite core; and a housing configured to receive and enable compression of the collet, the housing having a first end defining a first opening sized to receive the collet and a second end defining a second opening sized to enable insertion of the composite core and seating of the collet within the housing, wherein the exterior surface of the second end of the collet is textured to prevent slippage of the collet within the housing.

22. The fitting of claim 21, the fitting further comprising an implement that couples two fittings together to form a splice, said implement configured to engage with the collet housing of each fitting.

23. The fitting of claim 21, the fitting further comprising an implement that connects the fitting to a structure to form a dead-end, said implement configured to engage with the collet housing of the fitting.

24. The fitting of claim 21, wherein the fitting is connected to a second fitting in series to increase the compressive force on the core.

25. The fitting of claim 21, wherein the exterior surface of the first end of the collet is smooth to facilitate at least a portion of the first end of the collet to extend beyond the second end of the housing.

26. A fitting for a cable having a composite core comprising:

a collet having an outer surface defining a conical shape comprising an outer diameter that increases from a first end to a second end and an interior surface defining a lumen, the lumen having a substantially uniform interior diameter, the collet constructed of one or more sections that fit together to form the collet, each of the one or more sections defined by one or more longitudinal slits positioned to facilitate compression of the composite core, the interior surface of the lumen configured to prevent substantial penetration into the composite core; and a housing configured to receive and enable compression of the collet, the housing having a first end defining a first opening sized to receive the collet and a second end defining a second opening sized to enable insertion of the composite core and seating of the collet within the housing;

wherein the interior surface of the lumen is graded from smooth at the first end of the collet to rough at the second end of the collet, the surface grading designed to prevent substantial penetration into the core.

27. A splice fitting to connect a first electricity transmission cable to a second electricity transmission cable, each cable comprising a composite core surrounded by a conductor, the splice comprising:

at least two collet-type fittings, each fitting further comprising:

a collet comprised of one or more sections that form a truncated conical shape, the shape of the collet comprising an outer diameter that increases from a first end to a second end creating an outside slope to slide within a collet housing, the collet further comprising a concentrically oriented lumen, the lumen having a cross section defined by a substantially uniform interior diameter dimensioned to fit a cross section of composite core, the lumen having a length to fit a length of composite core, the lumen having an interior surface configured to prevent substantial penetration into the composite core;

a collet housing having a first open end to allow the collet to fit into the collet housing and a second open end having a smaller internal diameter than the first open end, the housing having a funnel shaped interior configured to receive the outside slope of the collet and enable compression of the collet and the composite core, the second open end of the housing having a diameter to allow a portion of the first end of the collet to extend beyond the second end of the collet housing to facilitate distribution of frictional force between the core and the lumen; and a connecting device that couples the at least two collet-type fittings to form the splice, wherein the first end of each collet housing is adapted to couple with the connecting device.

* * * * *